(12) United States Patent
Wong et al.

(10) Patent No.: US 12,550,090 B2
(45) Date of Patent: Feb. 10, 2026

(54) METHODS, TERMINAL, BASE STATION, CIRCUITRY AND SYSTEM FOR A NON-TERRESTRIAL NETWORK

(71) Applicant: Sony Group Corporation, Tokyo (JP)

(72) Inventors: Shin Horng Wong, Basingstoke (GB); Martin Warwick Beale, Basingstoke (GB)

(73) Assignee: Sony Group Corporation, Tokyo (JP)

(*) Notice: Subject to any disclaimer, the term of this patent is extended or adjusted under 35 U.S.C. 154(b) by 243 days.

(21) Appl. No.: 18/283,817

(22) PCT Filed: Mar. 11, 2022

(86) PCT No.: PCT/EP2022/056411
§ 371 (c)(1),
(2) Date: Sep. 25, 2023

(87) PCT Pub. No.: WO2022/207281
PCT Pub. Date: Oct. 6, 2022

(65) Prior Publication Data
US 2024/0179654 A1    May 30, 2024

(30) Foreign Application Priority Data

Mar. 31, 2021   (EP) .................................. 21166470

(51) Int. Cl.
 *H04W 56/00* (2009.01)
 *H04W 84/06* (2009.01)
(52) U.S. Cl.
 CPC ..... *H04W 56/0045* (2013.01); *H04W 56/006* (2013.01); *H04W 84/06* (2013.01)
(58) Field of Classification Search
 CPC ........... H04W 56/0045; H04W 56/006; H04W 84/06; H04B 7/1851
 See application file for complete search history.

(56) References Cited

U.S. PATENT DOCUMENTS

2021/0029658 A1   1/2021  Mahalingam et al.
2023/0113042 A1*  4/2023  Liberg .............. H04W 56/0045
                                                           455/427

(Continued)

FOREIGN PATENT DOCUMENTS

CN    111064539 A     4/2020
WO    2020/075044 A1  4/2020
WO    2022/152631 A1  7/2022

OTHER PUBLICATIONS

International Search Report and Written Opinion mailed on Jun. 29, 2022, received for PCT Application PCT/EP2022/056411, filed on Mar. 11, 2022, 10 pages.

(Continued)

*Primary Examiner* — Ashley Shivers
(74) *Attorney, Agent, or Firm* — XSENSUS LLP

(57) ABSTRACT

A method of operating a terminal in a non-terrestrial network "NTN" in a telecommunication system comprising the terminal configured to communicate with a base station via the NTN node. The method comprises identifying an uplink transmission to be transmitted as an uplink repetition series comprising a plurality of repetitions; identifying a first timing advance value for use as a current timing advance value for transmitting the uplink repetition series; identifying a first number $N_1$ of repetitions; transmitting, based on the first number $N_1$, a first set of repetitions of the uplink repetition series, using the first timing advance value; determining a second timing advance value; modifying a transmission timing of the uplink repetition series, wherein modifying the transmission timing comprises updating the current timing advance value to the second timing advance value; and transmitting a second set of repetitions of the uplink repetition series using the current timing advance value.

18 Claims, 9 Drawing Sheets

(56) References Cited

U.S. PATENT DOCUMENTS

2023/0422195 A1* 12/2023 Yao .................... H04B 7/18513
2024/0073845 A1*  2/2024 Jiang ................... H04W 56/005

OTHER PUBLICATIONS

3GPP, "Foreword", 3GPP TS 36.133 V14.3.0, Mar. 2017, pp. 64-506.
3GPP, "Solutions for NR to support non-terrestrial networks (NTN) (Release 16)", 3GPP TR 38.821 V16.0.0, Dec. 2019, pp. 1-140.
Mediatek et al., "UL Time and Frequency Synchronisation for NR-NTN", 3GPP TSG RAN WG1 Meeting #102e, R1-2005496, Aug. 24-28, 2020, 14 pages.
Mediatek Inc., "New Study WID on NB-IoT/eTMC support for NTN", 3GPP TSG RAN Meeting #86, RP-193235, Dec. 9-31, 2019, 4 pages.
3GPP, "Study on New Radio (NR) to support non-terrestrial networks (Release 15)", 3GPP TR 38.811 V15.4.0, Sep. 2020, pp. 1-127.

* cited by examiner

METHODS, TERMINAL, BASE STATION, CIRCUITRY AND SYSTEM FOR A NON-TERRESTRIAL NETWORK

CROSS-REFERENCE TO RELATED APPLICATIONS

The present application is based on PCT filing PCT/EP2022/056411, filed Mar. 11, 2022, which claims priority to European Patent Application No. 21166470.1, filed Mar. 31, 2021, the contents of each are incorporated by reference in their entireties.

BACKGROUND

Field

The present disclosure relates generally to terminals, base stations, circuitry and methods of operating terminals and base stations, and specifically to configuring an uplink transmission timing for terminals in a non-Terrestrial Network, NTN.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the third generation partnership project (3GPP) defined UMTS and Long Term Evolution (LTE) architectures, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example, it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles. There is similarly expected to be a desire for such connectivity to be available over a wide geographic area.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1]. Other NTN relevant discussions are also provided in TR 38.821 [2].

Non-terrestrial networks may provide service in areas that cannot be covered by terrestrial cellular networks (i.e. those where coverage is provided by means of land-based antennas), such as isolated or remote areas, on board aircraft or vessels, or may provide enhanced service in other areas. The expanded coverage that may be achieved by means of non-terrestrial networks may provide service continuity for machine-to-machine (M2M) or 'internet of things' (IT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY

The invention is defined in the appended independent claims. The present disclosure includes example arrangements falling within the scope of the claims (and other arrangements may also be within the scope of the following claims) and may also include example arrangements that do not necessarily fall within the scope of the claims but which are then useful to understand the invention and the teachings and techniques provided herein.

The invention is defined in the appended independent claims. Further improvements are defined in the dependent claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
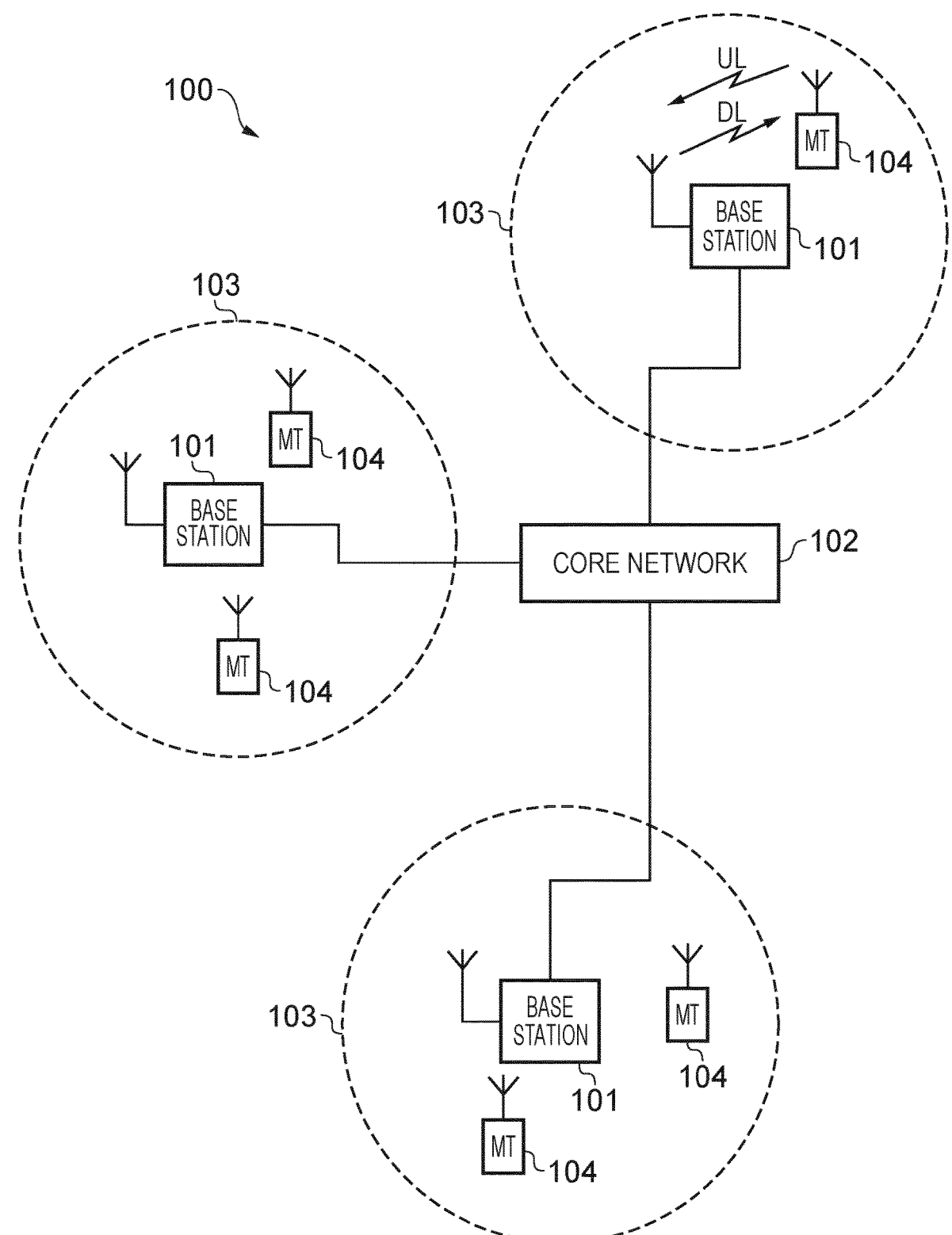
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs (eNB), g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity, certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
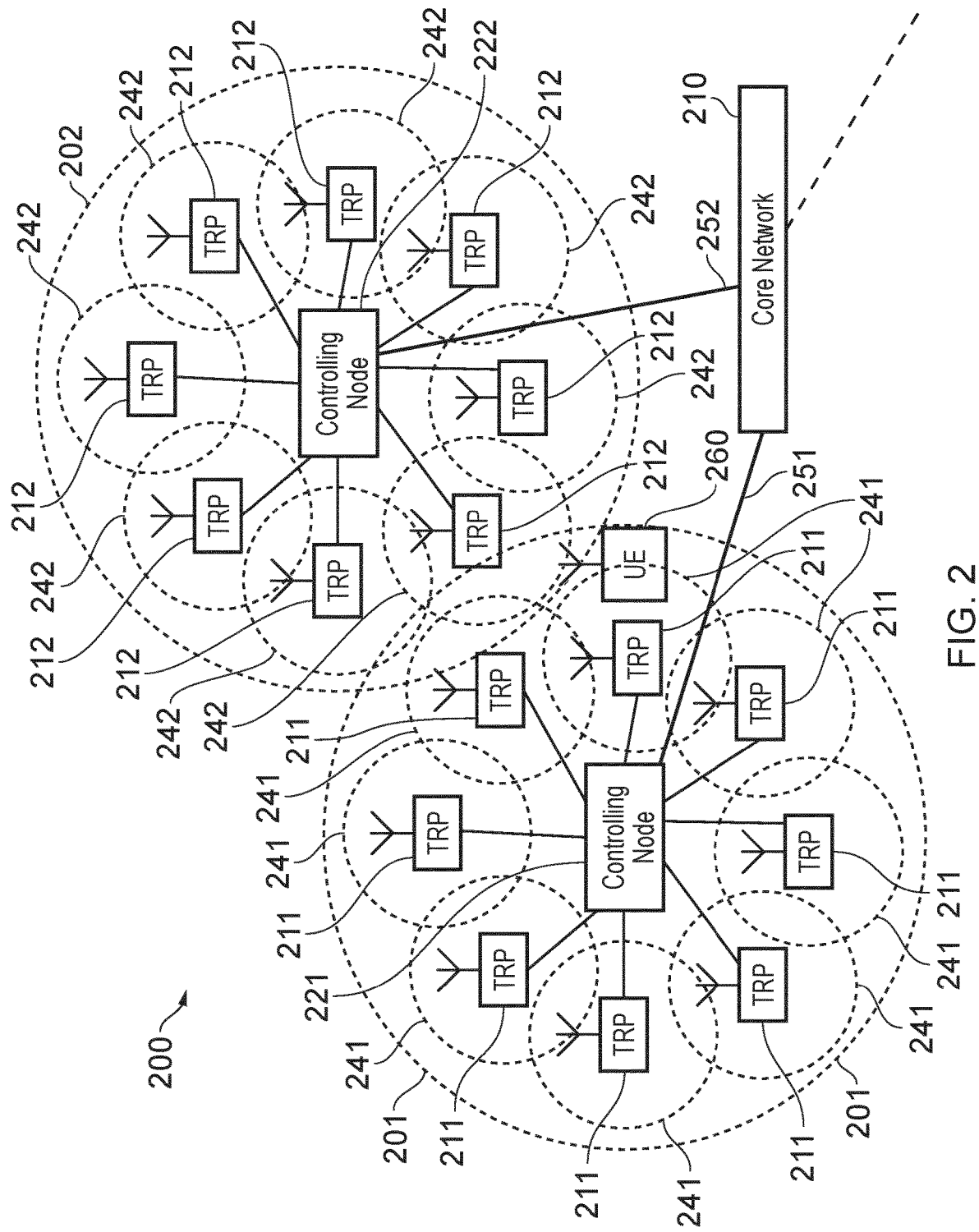
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling 10 transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
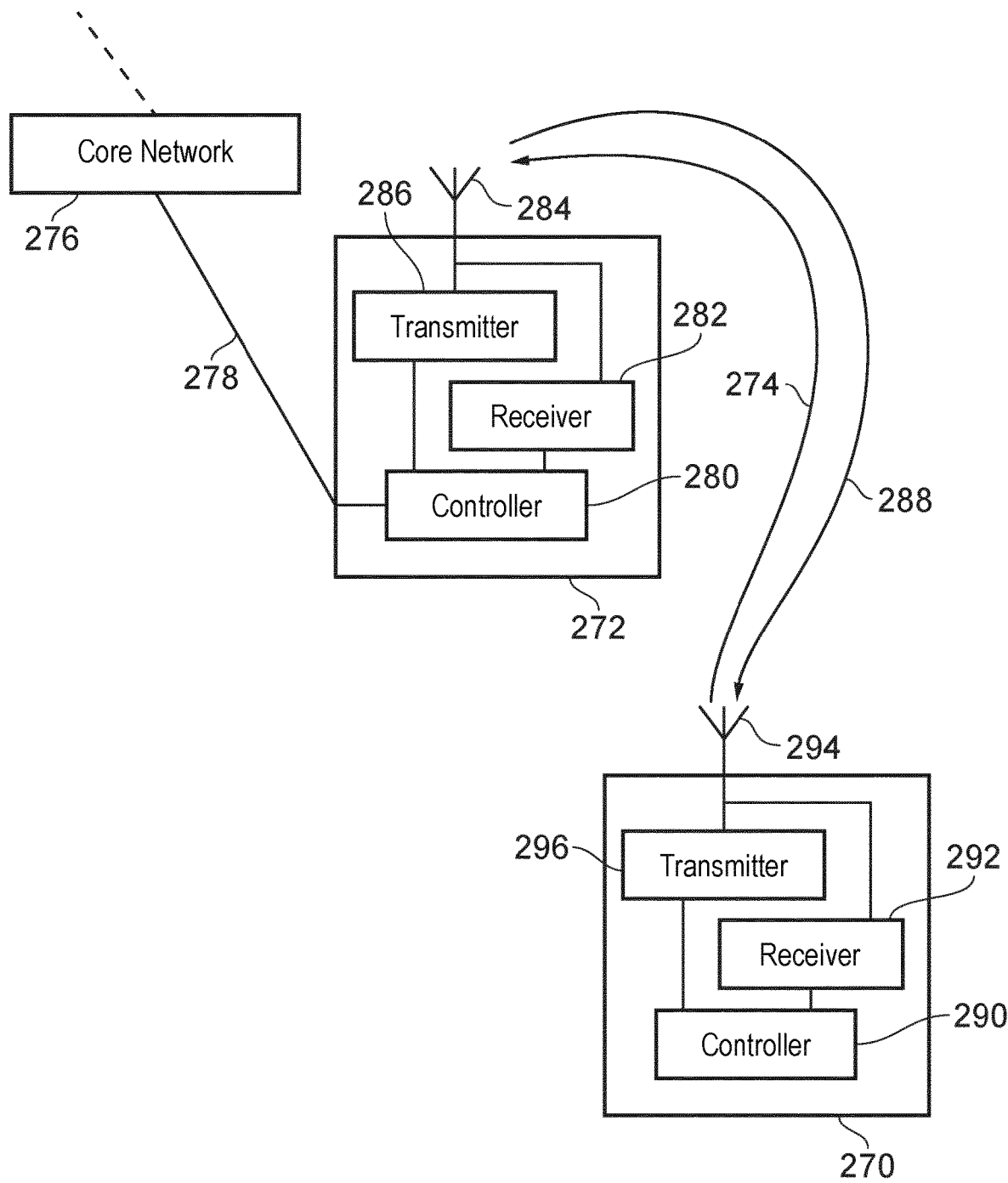
FIG. 3 is a schematic block diagram of an example infrastructure equipment and communications device configured in accordance with example embodiments.

A more detailed illustration of a communications device 270 and an example network infrastructure equipment 272, which may be thought of as an eNB or a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Non-Terrestrial Networks (NTNs)

Figure 4:
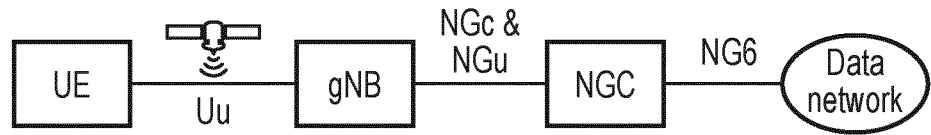
FIG. 4 is reproduced from [1], and illustrates a first example of a non-terrestrial network (NTN) based on a satellite/aerial platform with a bent pipe payload.
Figure 5:
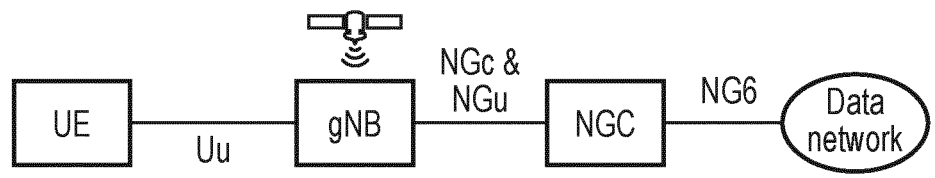
FIG. 5 is reproduced from [1], and illustrates a second example of an NTN based on a satellite/aerial platform co-located with a gNodeB.

An overview of NR-NTN can be found in [1], and much of the following wording, along with FIGS. 4 and 5, has been reproduced from that document as a way of background.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by terrestrial 5G networks (isolated/remote areas, on board aircrafts or vessels) and under-served areas (e.g. sub-urban/rural areas) to upgrade the performance of limited terrestrial networks in a cost effective manner;
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to
- enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive. It should also be noted that the same NTN benefits apply to 4G and/or LTE technologies and that while NR is sometimes referred to in the present disclosure, the teachings and techniques presented herein are equally applicable to 4G and/or LTE.

FIG. 4 illustrates a first example of an NTN architecture based on a satellite/aerial platform with a bent pipe payload, meaning that the same data is sent back down to Earth as is received by the satellite/aerial platform, with only frequency or amplification changing; i.e. acting like a pipe with a u-bend. In this example NTN, the satellite or the aerial platform will therefore relay an NR signal between the gNodeB (or eNodeB) and UEs in a transparent manner.

FIG. 5 illustrates a second example of an NTN architecture based on a satellite/aerial platform comprising a gNodeB (or eNodeB in the examples of this disclosure). In this example NTN, the satellite or aerial platform carries a full or part of a gNodeB to generate or receive an NR signal to/from the UEs. This requires the satellite or aerial platform to have sufficient on-board processing capabilities to be able to include a gNodeB or eNodeB functionality.

Figure 6:
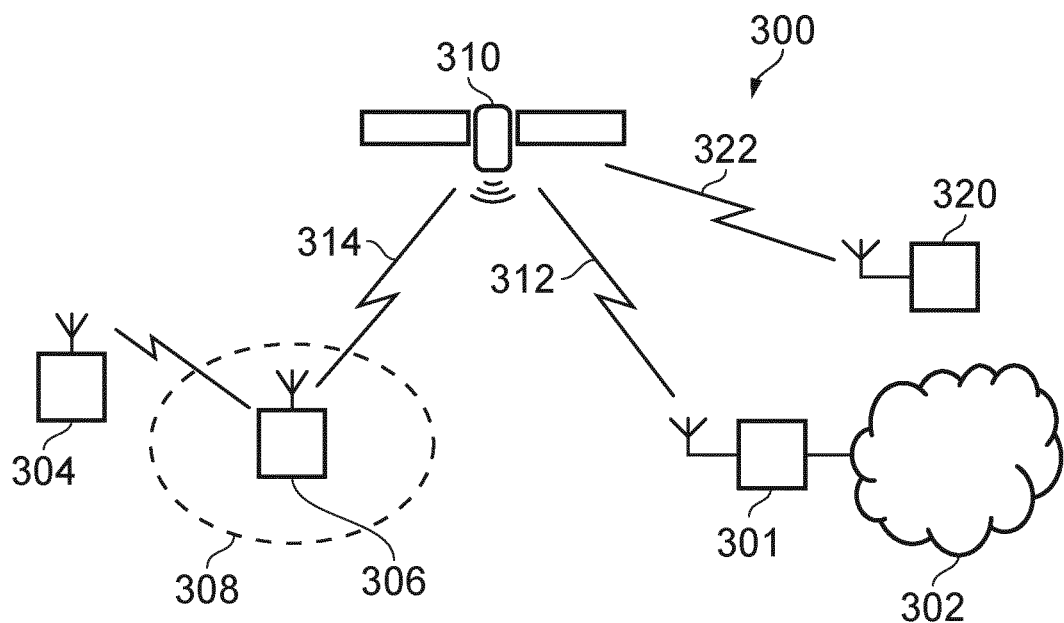
FIG. 6 schematically shows an example of a wireless communications system comprising an NTN part and a terrestrial network (TN) part which may be configured to operate in accordance with embodiments of the present disclosure.

FIG. 6 schematically shows an example of a wireless communications system 300 which may be configured to operate in accordance with embodiments of the present disclosure. The wireless communications system 300 in this example is based broadly around an LTE-type or 5G-type architecture. Many aspects of the operation of the wireless communications system/network 300 are known and understood and are not described here in detail in the interest of brevity. Operational aspects of the wireless communications system 300 which are not specifically described herein may be implemented in accordance with any known techniques, for example according to the current LTE-standards or the proposed 5G standards.

The wireless communications system 300 comprises a core network part 302 (which may be a 4G core network or a 5G core network) in communicative connection with a radio network part. The radio network part comprises a terrestrial station 301 connected to a non-terrestrial network part 310. The non-terrestrial network part 310 may be an example of infrastructure equipment. Alternatively, or in addition, the non-terrestrial network part 310 may be mounted on a satellite vehicle or on an airborne vehicle. In some cases, the base station (e.g. g-Node B/e-node B) may be fully implemented in the terrestrial station 301 or in the non-terrestrial network part 310, or may be partially implemented in one or both of the terrestrial station 301 or in the non-terrestrial network part 310.

The non-terrestrial network part 310 may communicate with a communications device 306, located within a cell 308, by means of a wireless access interface provided by a wireless communications link 314. For example, the cell 308 may correspond to the coverage area of a spot beam generated by the non-terrestrial network part 310. The boundary of the cell 308 may depend on an altitude of the non-terrestrial network part 310 and a configuration of one or more antennas of the non-terrestrial network part 310 by which the non-terrestrial network part 310 transmits and receives signals on the wireless access interface.

The non-terrestrial network part 310 may be a satellite in an orbit with respect to the Earth, or may be mounted on such a satellite. For example, the satellite may be in a geo-stationary earth orbit (GEO) such that the non-terrestrial network part 310 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 310 may complete an orbit of the Earth relatively quickly, thus providing moving cell coverage. Alternatively, the satellite may be in a non-geostationary orbit (NGSO), so that the non-terrestrial network part 310 moves with respect to a fixed point on the Earth's surface. The non-terrestrial network part 310 may be an airborne vehicle such as an aircraft, or may be mounted on such a vehicle. The airborne vehicle (and hence the non-terrestrial network part 310) may be stationary with respect to the surface of the Earth or may move with respect to the surface of the Earth.

In FIG. 6, the terrestrial station 301 is shown as ground-based, and connected to the non-terrestrial network part 310 by means of a wireless communications link 312. The non-terrestrial network part 310 receives signals representing downlink data transmitted by the terrestrial station 301 on the wireless communications link 312 and, based on the received signals, transmits signals representing the downlink data via the wireless communications link 314 providing the wireless access interface for the communications device 306. Similarly, the non-terrestrial network part 310 receives signals representing uplink data transmitted by the communications device 306 via the wireless access interface comprising the wireless communications link 314 and transmits signals representing the uplink data to the terrestrial station 301 on the wireless communications link 312. The wireless communications links 312, 314 may operate at a same frequency, or may operate at different frequencies.

The extent to which the non-terrestrial network part 310 processes the received signals may depend upon a processing capability of the non-terrestrial network part 310. For example, the non-terrestrial network part 310 may receive signals representing the downlink data on the wireless communication link 312, amplify them and (if needed) re-modulate them onto an appropriate carrier frequency for onwards transmission on the wireless access interface provided by the wireless communications link 314. Alternatively, the non-terrestrial network part 310 may be configured to decode the signals representing the downlink data received on the wireless communication link 312 into un-encoded downlink data, re-encode the downlink data and modulate the encoded downlink data onto the appropriate carrier frequency for onwards transmission on the wireless access interface provided by the wireless communications link 314.

The non-terrestrial network part 310 may be configured to perform some of the functionality conventionally carried out by the base station. In particular, latency-sensitive functionality (such as acknowledging a receipt of the uplink data, or responding to a RACH request) may be performed by the non-terrestrial network part 310 partially implementing some of the functions of the base station.

As mentioned above, the base station may be co-located with the non-terrestrial network part 310; for example, both may be mounted on the same satellite vehicle or airborne vehicle, and there may be a physical (e.g. wired, or fibre optic) connection on board the satellite vehicle or airborne vehicle, providing the coupling between the base station and the non-terrestrial network part 310. In such co-located arrangements, a wireless communications feeder link between the base station and a terrestrial station 301 may provide connectivity between the base station (co-located with the non-terrestrial network part 310) and the core network part 302.

In some cases, the communications device 306 shown in FIG. 6 may be configured to act as a relay node. That is, it may provide connectivity to one or more terminal devices such as the terminal device 304. When acting as a relay node, the communications device 306 transmits and receives data to and from the terminal device 304, and relays it, via the non-terrestrial network part 310 to the terrestrial station 301. The communications device 306, acting as a relay node, may thus provide connectivity to the core network part 302 for terminal devices which are within a transmission range of the communications device 306.

In some cases, the non-terrestrial network part 310 is also connected to a ground station 320 via a wireless link 322. The ground station may for example be operated by the satellite operator (which may be the same as the mobile operator for the core and/or radio network or may be a different operator) and the link 322 may be used as a management link and/or to exchange control information. In some cases, once the non-terrestrial network part 310 has identified its current position and velocity, it can send position and velocity information to the ground station 320. The position and velocity information may be shared as appropriate, e.g. with one or more of the UE 306, terrestrial station 301 and base station, for configuring the wireless communication accordingly (e.g. via links 312 and/or 314).

It will be apparent to those skilled in the art that many scenarios can be envisaged in which the combination of the communications device 306 and the non-terrestrial network part 310 can provide enhanced service to end users. For example, the communications device 306 may be mounted on a passenger vehicle such as a bus or train which travels through rural areas where coverage by terrestrial base stations may be limited. Terminal devices on the vehicle may obtain service via the communications device 306 acting as a relay, which communicates with the non-terrestrial network part 310.

It will be appreciated that communications device 306 may not act as a relay and may communicate with the network via the NTN part 310, with or without being connected to another terminal 304. For example, communications device 306 might be an IoT device communicating with the network via NTN part 310.

The distance between the UE and the eNB in an NTN deployment is significantly larger than that in a terrestrial cellular network. For example, a Low Earth Orbit "LEO" satellite can operate in an orbit at an altitude of between 600 km to 1200 km. The elevation angle of the LEO satellite with respect to the UE can lead to distances between the UE and LEO satellite being greater still. Hence, the propagation delay between the UE and the eNB is significantly larger, especially in an NTN deployment using a transparent satellite where the Round Trip Time "RTT" will be longer compared to a case where the base station is co-located with the non-terrestrial network part (e.g. it may in some cases be twice as long, or less or longer depending on the distance between the non-terrestrial network part and the base station). For example, in an NTN using a transparent LEO satellite, the RTT (Round Trip Time) between the UE and eNB can be 8 ms to 25.77 ms [2]. For a GEO satellite, the RTT can be hundreds of ms, e.g. 541 ms. In order to take into account this large propagation delay, uplink transmissions would need to apply a large Timing Advance and the eNB would need to take this into account for scheduling of uplink data. The timing advance that needs to be applied depends on the location of the UE within the cell footprint of the satellite. Since the cell footprint can be large, there can be a large variation of the timing advance that needs to be applied, depending on the UE location within the cell footprint.

Additionally, the NTN system also needs to take into account the movement of the satellite. For example, a LEO satellite can be travelling at 7.56 km/second (27,216 km/h) relative to the UE [2], which can cause a significant Doppler shift that the UE needs to compensate for. In order to factor in the Doppler shift, i.e. pre-compensate for frequency shift for UL transmissions, the UE needs to know its own geo-location and the position and velocity of the satellite.

The geo-location of the UE can be obtained from a GNSS (Global Navigation Satellite System). It is usually assumed that a UE capable of supporting NTN has GNSS capability [2] or is able to use any other system for determining its location (e.g. absolute location or relative location with respect to the satellite).

Accordingly, particular challenges can be faced with non-terrestrial deployments. For example, when considering NTN systems for machine-type communications, such as NB-IOT, MTC and/or eMTC, further challenges can be faced as the devices may have limited transmission power and/or battery power and/or battery charge. Reference [3] is a 3GPP IoT-NTN Work Item document which aims to define features relating to satellite connectivity for NB-IOT and eMTC devices and may be of interest to the skilled reader. Reference [4] discusses a study on NB-IOT/eMTC support for Non-Terrestrial Networks and may also be of interest to the skilled reader. EP Application EP21151456.7 filed 13 Jan. 2021 (reference [5]), may also be of interest to the skilled reader and the contents of this application are incorporated herein by reference.

Many IoT devices have limited capabilities in terms of power consumption and particularly in terms of battery lifetime. Accordingly, power saving measures to conserve power at the terminal can be greatly beneficial.

For satellite communications (such as communications with GEO and LEO satellites), many repetitions may be required in the uplink and downlink to ensure successful transmission of a packet, using coverage enhancement techniques. The large number of repetitions may be required due to the high pathloss between the UE and satellite. The high pathloss reduces the Signal-to-Noise Ratio (SNR) and long transmissions in time (through repetitions) are often used in order to increase the likelihood that the packet arrives with an amount of energy that is sufficient for successful decoding. For eMTC, approximately 256 repetitions may be often deemed optimal and the number of repetitions can go up to 2048 in eMTC. Such transmissions can take up to 256 ms or 2.048 s to complete. It should be noted that repetitions can be used for both or either of uplink and downlink transmissions (e.g. for PDSCH and/or PDCCH and PUSCH; PUCCH and/or PRACH). While in current systems, PRACH, PDCCH and PUCCH transmissions are usually configured with fewer repetitions than the corresponding PDSCH and PUSCH transmissions, the same teachings and principles apply to these transmissions. In some arrangements in NB-IOT, an uplink transmission can last for about 4 seconds in length.

In conventional eMTC/NB-IOT, the timing advance (TA) is updated infrequently, as the UE's movements are expected to be limited. Typically, in IoT-NTN, the UE is expected to measure its location using a GNSS and, from the positioning information obtained, the UE can derive a TA configuration for uplink transmissions. Currently, this is done prior to an uplink transmission so that the terminal is able to identify which TA configuration it will use for its uplink transmission. While a GNSS measurement procedure can take a relatively long time to complete and is costly in time resources, such techniques are deemed suitable as they allow the terminal to select a timing advance configuration for a (conventional and relatively short) uplink transmission, e.g. for a single PUSCH transmission.

However, with IoT-NTN, while the UE is expected to move in possibly a similar manner as for a terrestrial network, the air-borne device (e.g. satellite) can move rapidly. For example, a LEO satellite can move at about 7600 m/s relative to the ground (and thus at approximately the same speed relative to the UE) such that the distance between the satellite and UE can change rapidly, and more rapidly than in legacy systems for which the techniques and procedures of the network have been designed. For example, the actual Timing Advance (TA) for uplink transmissions can also change in a corresponding manner. However, attempting to re-use the above TA techniques for uplink transmission with numerous repetitions present significant challenges as the TA may change during the uplink transmission thereby causing transmission issues. Another challenge is that, while trying to make adaptations to better support NTN systems may be desirable, it is usually preferred to provide techniques which have a limited impact on existing or legacy elements and procedures.

Looking again at the challenges faced with NTN, one challenge is that the TA variations can be considerably more difficult to handle when considered in the context of repetitive uplink transmission in IoT-NTN.

For example, if the satellite is moving rapidly away from the UE, as it moves away, the distance between the UE and satellite increases and therefore the required TA also increases. Hence in a repetitive transmission, for each subsequent repetition, the uplink subframe transmission would arrive slightly later from the expected subframe boundary at the eNB. If the same TA is used throughout, after a larger number of repetitions, the uplink transmission may arrive too late relative to the subframe configuration at the eNB and the transmission may thus fail. For example, the transmission may arrive late and overlap in time with a subsequent subframe at the satellite, which can be viewed as the transmission colliding with a subsequent subframe.

Figure 7:
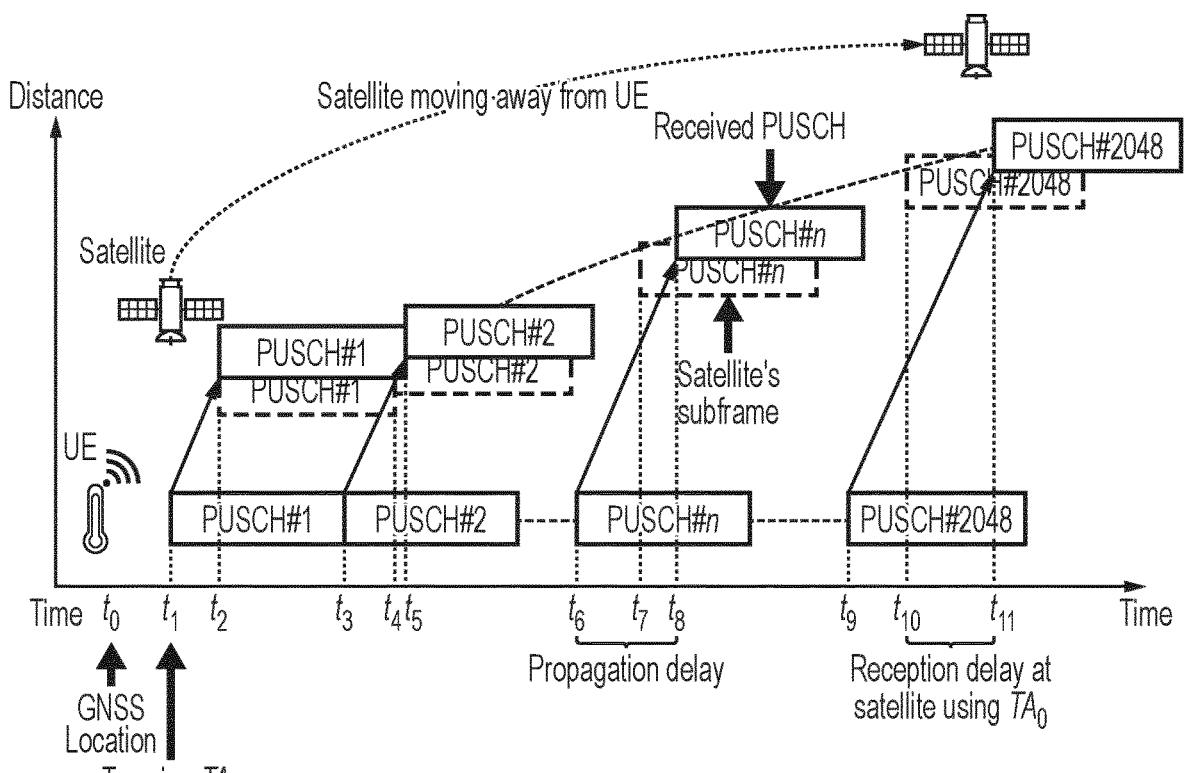
FIG. 7 illustrates an example of a repeated transmission with an air-borne device moving away from a terminal.

FIG. 7 illustrates an example of a repeated transmission with an air-borne device moving away from the terminal. In this example, a UE is scheduled to transmit a PUSCH transmission (simply referred to as a PUSCH for conciseness) with 2048 repetitions to a satellite which is moving away from the UE. At time $t_0$ prior to the PUSCH, the UE obtains location or localization information via GNSS and determines an initial TA parameter, $TA_0$. $TA_0$ is used by the UE to transmit the first PUSCH, PUSCH #1 at time $t_1$. Using $TA_0$, PUSCH #1 is expected to arrive at the start of the satellite's subframe boundary (shown as a dashed box in FIG. 7) at time $t_2$. Using the same $TA_0$, PUSCH #2 would arrive at time $t_5$ which would be later (delayed) relative to the start of the satellite's subframe boundary (time $t_4$). This is because the satellite has moved further away from the UE compared to when the TA parameter was estimated. It will be appreciated that FIGS. 7-9 and 13 are provided to illustrate the challenges and techniques provided herein and may involve a degree of simplification for ease of representation. For example, while FIG. 7 shows the satellite's subframe boundary being within the UE's subframe boundary, it will be appreciated that this is unlikely to be the case in many NTN systems. Indeed, there is a transmission delay due to the propagation time between UE and satellite which, in most cases, is expected to be longer than illustrated in these Figures. For example, for a LEO satellite with an altitude of 600 km that is directly overhead the UE, the transmission delay is expected to be of about 2 ms, such that PUSCH #1 (if we assume that the system uses a 1 ms subframe) would start arriving at the satellite at about the same time as the transmission of PUSCH #2 by the terminal ends. Depending on the type of NTN device, altitude, speed and relative position with the terminal, the transmission delay can be even longer than this and the transmissions would arrive even later. However, for ease of representation, the transmission delays illustrated on the figure have not been represented to scale.

As the UE continues to use $TA_0$ and the satellite moves away from the UE, each subsequent PUSCH repetition will arrive later in the satellite's subframe than the previous PUSCH repetition. In other words, as the PUSCH repetitions are being transmitted, the arrival delay relative to the satellite's subframe boundary will accumulate and increase. When this accumulated delay becomes too great, for example exceeds a certain threshold, the uplink transmission may be received so degraded that the benefit of the repetition scheme may be reduced, if provided at all. For example, if the uplink transmission is received such that the delay is greater than the duration of the Cyclic Prefix of the PUSCH, the degradations may be more greatly felt. It should also be noted that the delay may be occurring gradually such that the quality of the overall transmission, taking into account all received repetitions of the transmission might also gradually (and potentially slowly) degrade rather than suddenly reaching a point at which the degradations becomes beyond repair. For example, the decoding performance can be degraded even when the accumulated delay exceeds only a fraction of the cyclic prefix since there would then be a smaller portion of the cyclic prefix that could be used to accommodate other system impairments, such as multipath delay spread.

Figure 8:
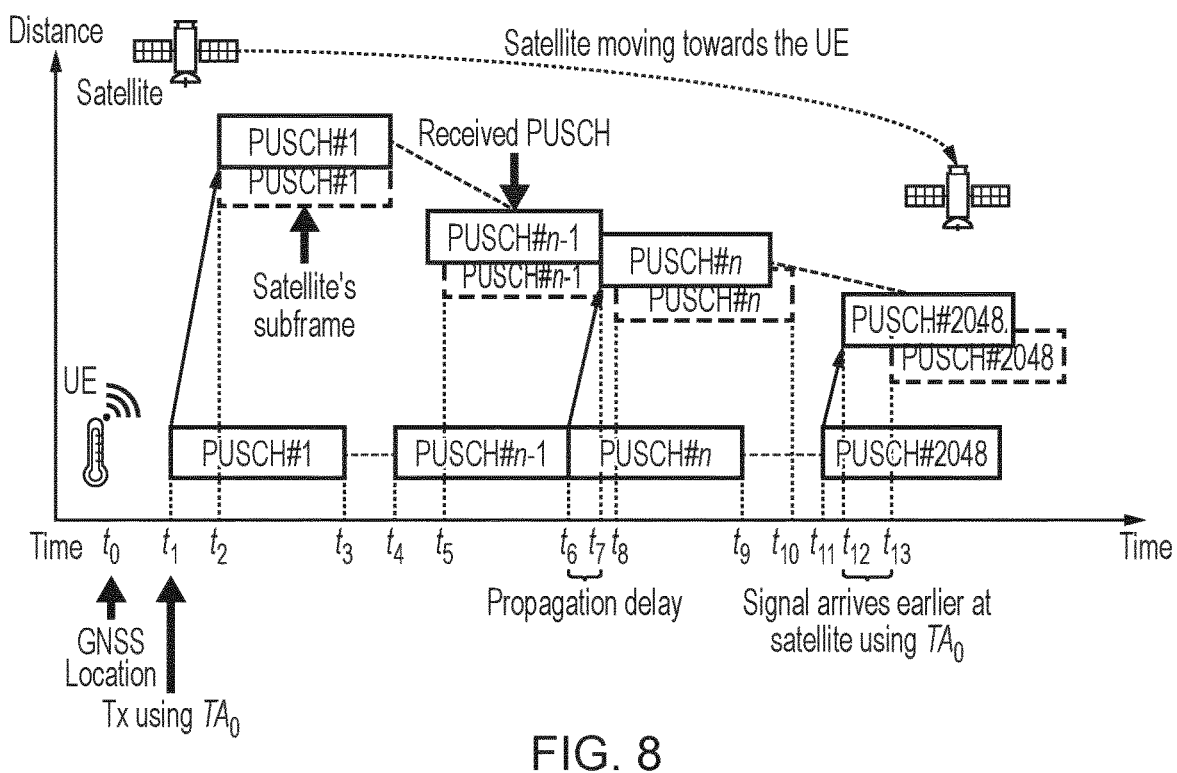
FIG. 8 illustrates an example of a repeated transmission with an air-borne device moving towards a terminal.

Likewise, when a satellite moves towards the UE, the distance between the satellite and UE decreases thereby reducing the value of the ideal TA parameter. FIG. 8 illustrates an example of a repeated transmission with an air-borne device moving towards a terminal and mirrors FIG. 7 above, but in a situation where the distance between the UE and satellite varies in the opposite direction. Here, for a repetitive transmission, the repetition of the uplink transmission would arrive earlier for each subsequent repetition and may thus start before the start of a subframe at the satellite. This can be viewed as the transmission colliding with a previous subframe at the satellite. For example and as illustrated in FIG. 8, at a time $t_0$ before the uplink transmission, the UE obtains GNSS location information and derives an initial TA configuration $TA_0$. The UE uses $TA_0$ for all its repetitions and at the $n^{th}$ repetition, PUSCH #n transmitted at time $t_6$, using $TA_0$, will arrive at time $t_7$ which is before the actual start of the subframe (at the satellite) for PUSCH #n and possibly within an earlier subframe of the satellite—for example a subframe which may be for receiving PUSCH #n−1 at the satellite. There is therefore possibly a point at which the uplink transmission would arrive too early into a previous subframe at the satellite such that the satellite cannot decode it (individually and/or added with other repetitions).

Said differently, the shifting of the arrival time of the transmissions, relative to the subframe timing at the satellite, and the potential overlap between a received transmission and a subframe for another repetition (with a previous repetition when the distance reduces and a next repetition when the distance increases) can reduce the performance of the system, e.g. by impacting the ability of the system to rely on the cyclic prefix of the transmissions and thereby impairing decoding performance.

It should be noted that even though the PUSCH subframe timings or time windows have been represented as contiguous transmissions in FIGS. 7 and 8, it will be appreciated that this is merely a non-limiting example and that the same principles and challenges occur with different relative timings for the repetitions. As the skilled person will appreciate, the shifting between the actual arrival time and the target arrival time of an uplink transmission can cause problems regardless of this aspect. It should also be noted that the distance between the terminal and device may not vary in a linear manner. Likewise, the change in distance may not always be in the same direction and the NTN node might be getting closer first and then further away once it has passed the terminal, with the distance first decreasing and then increasing. The techniques presented herein are applicable to any distance variation experienced by the UE.

Additionally and as mentioned above, it will be appreciated that the representations of FIGS. 7 and 8 (and FIGS. 9 and 13) are schematic ones and may not be to scale. For example, the relative time spread of the uplink transmission arriving at the NTN node and relative to the original timing when transmitted may be greater or smaller than represented in these Figures. For ease of illustration of the challenges faced, the timing delays or advances have been represented such that they are visible in the figures rather than to illustrate an expected scale.

Accordingly, it can desirable to provide mechanisms to try to limit the impact of accumulation of the difference between an expected arrival time of an uplink transmission at an NTN node compared to the actual arrival which is for example caused by a variation in distance between the terminal and the NTN node.

In accordance with the present disclosure, techniques are provided which involve a reconfiguration of the timing of the transmission of the repetitions, including the timing advance configuration for use by the terminal for transmitting the repeated transmissions which can be updated while the transmission of the repetitions is ongoing. In some cases, this can be combined with at least a partial cancellation of the transmission of one or more repetitions. Accordingly, the effect of accumulation of timing advance errors in repeated transmissions in an NTN system can be reduced and the likelihood of having a successful transmission is thereby increased. As a result, by adjusting the TA configuration for one or more remaining repetitions to be transmitted (rather than using the same configuration for all repetitions) and optionally, by cancelling the transmission of at least one repetition, the likelihood of corruptions and of unsuccessful decoding caused by the advance or delay of repetition(s) can be reduced.

The UE can update its TA configuration, for example by applying a TA compensation factor $\Delta TA$ relative to a previous TA configuration. The compensation factor $\Delta TA$ can be applied by the terminal after a number $N_{TA}$ (or $N_{TA}-1$, depending on implementation and convention) of repetitions using the previous TA configuration. For example, it can be applied after every $N_{TA}$ repetitions and the number $N_{TA}$ can be adjusted during the repetitions (for example with a first adjustment of the TA configuration after $N_{TA1}$ repetitions and a second TA adjustment after $N_{TA2}$ repetitions, with $N_{TA2}$ being different from $N_{TA1}$). Further discussions of the $N_{TA}$ parameter are provided below.

Figure 9:
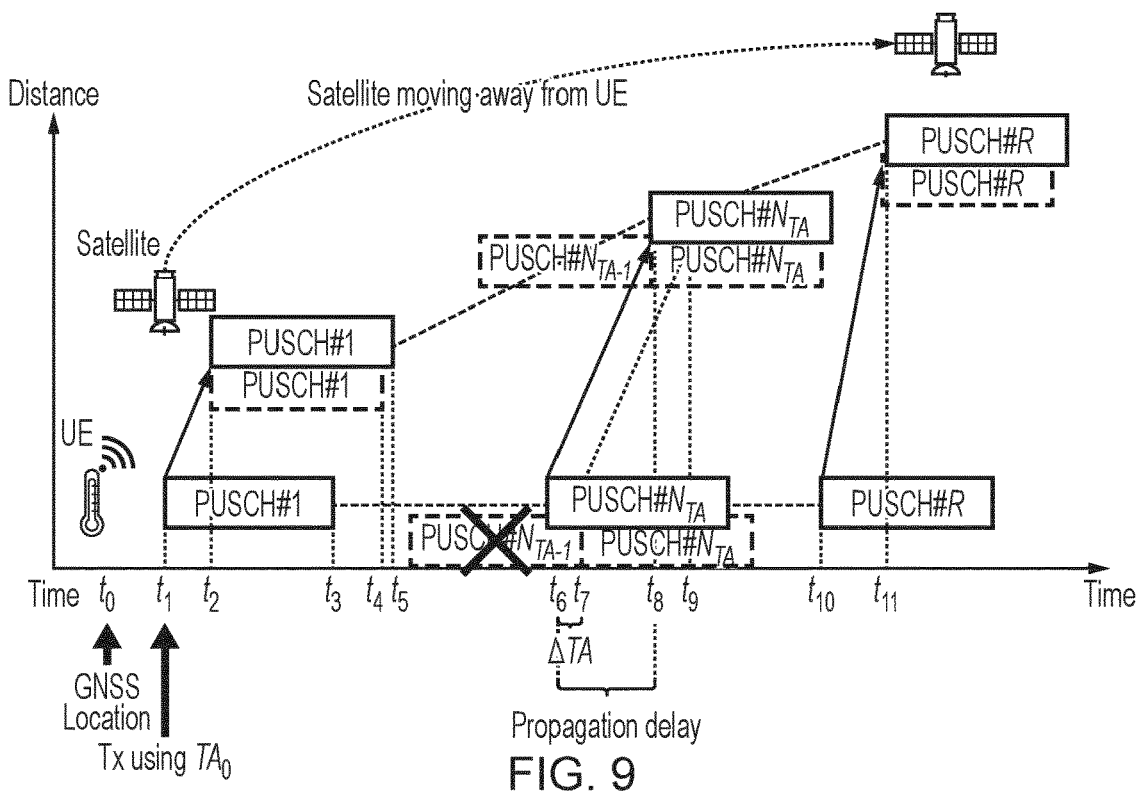
FIG. 9 illustrates an example of adjusting transmission parameters for transmitting repetitions in an NTN system.

FIG. 9 illustrates an example of adjusting transmission parameters for transmitting repetitions in an NTN system where the NTN node moves away from the terminal. In this example situation, the UE obtains its GNSS location to determine its TA ($TA_0$) prior to a PUSCH transmission with R repetitions. The UE applies the initial $TA_0$ for the first $N_{TA}-1$ PUSCH repetitions. After the initial number of repetition and for the $N_{TA}^{th}$ transmission PUSCH #$N_{TA}$, it can apply a compensation adjustment parameter $\Delta TA$ to correct the timing of the transmission. The terminal can use the adjustment to derive a new TA parameter $TA_1$ using $TA_1=TA_0+\Delta TA$ for the next $N_{TA}$ PUSCH repetitions (from PUSCH #$N_{TA}$ to PUSCH #$2N_{TA}-1$). As mentioned above, in some cases the new TA parameter can be applied for the next $N_{TA2}$ repetitions where $N_{TA2}$ may be greater or smaller than the previous $N_{TA}$ parameter. As shown in FIG. 9, if the UE had continued to use $TA_0$, it would have transmitted PUSCH #$N_{TA}$ at time $t_y$ and PUSCH #$N_{TA}$ would have arrived late at the satellite's subframe at time $t_9$, after the expected arrival time $t_8$.

In this example, the UE cancels the transmission of PUSCH #$N_{TA}-1$ and transmits PUSCH #$N_{TA}$ applying a $\Delta TA$ correction relative to the time $t_7$ based on the previous TA parameter. In this case, the correction is for a smaller timing advance, which can be seen as a negative correction to be applied to the previous TA parameter. Accordingly, PUSCH #$N_{TA}$ is transmitted at a time $t_6$ earlier than $t_7$ so that PUSCH #$N_{TA}$ is expected to arrive at the start of the satellite's subframe boundary at time $t_8$. As discussed above and below, it will be appreciated that in other examples, the transmission timing of repetitions may be adjusted, thereby creating or introducing a gap between the transmission of two subsequent repetitions without any repetition cancellation.

It should be noted that while the transmission of PUSCH #$N_{TA}$-1 was cancelled in this example, in other examples, the transmission of PUSCH #$N_{TA}$ could be cancelled and PUSCH #$N_{TA}$+1 could be transmitted after PUSCH #$N_{TA}$-1 Accordingly, the transmission of one repetition is cancelled and the timing of the remaining transmissions is adjusted based on an updated TA parameter. For example, it will be appreciated that, depending on the relative timing of the calculation of the TA adjustment parameter and of the transmission of the repetition, in some implementations PUSCH #$N_{TA}$-1 might have already been transmitted and/or the transmission of PUSCH #$N_{TA}$-1 might have already started when it is determined that an uplink transmission will be cancelled. In such a case, PUSCH #$N_{TA}$ could be cancelled and PUSCH #$N_{TA}$+1 may be the repetition transmitted after PUSCH #$N_{TA}$-1, as the first repetition transmitted with the updated timing advance parameter.

While FIG. 9 only illustrates a single adjustment of the TA parameter, it will be appreciated that these techniques may be applied multiple times throughout the transmissions of the repetitions (regardless of whether the correction assists with a possible correction of delayed or advanced transmissions of the repetitions). For example, and assuming that the correction is applied at every $N_{TA}^{th}$ repetition (even though this is not limited to this), for the $2N_{TA}^{th}$ repetition, the UE can further update the TA parameter, for example to $TA_2=TA_0+\Delta TA_1+\Delta TA_2$ which is equivalent to $TA_2=TA_1+\Delta TA_2$, as the previous TA value used by the UE was $TA_1$ and the next TA correction amount is $\Delta TA_2$. Accordingly, the terminal can periodically and/or repeatedly add a TA correction parameter $\Delta TA$ term to the previously used TA during the transmission of the repetitions. In general, it is expected that $\Delta TA_1$ will differ from $\Delta TA_2$, but it is not excluded that the two adjustment parameters happen to match exactly or approximatively. It may also be appreciated that the various corrections applied during the transmission of the repetitions may be positive and/or negative. For example a first correction may be to correct a delayed transmission (e.g. to increase the TA parameter and transmit earlier) with a positive $\Delta TA$ or may be to correct an advanced transmission (e.g. to decrease the TA parameter and transmit later) with a negative $\Delta TA$.

Figure 10:
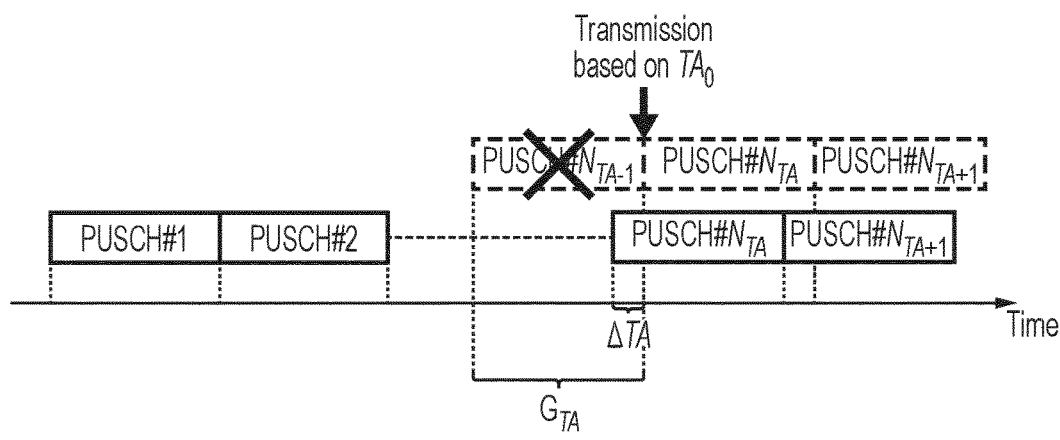
FIG. 10 illustrates an example of changes in transmission timing at a terminal.

FIG. 10 illustrates an example of changes in transmission timing at a terminal in a case where the distance between the NTN node and the terminal increases. The uplink transmissions in dotted line represent the original timing for these transmissions based on the previous TA configuration. In this case, to compensate for delayed transmissions, PUSCH #$N_{TA}$-1 is cancelled and the next transmitted PUSCH is PUSCH #$N_{TA}$, where this PUSCH is transmitted with the updated TA parameter. The teachings provided above, e.g. in respect of FIG. 9, apply equally to this example. From one perspective, the cancellation of an uplink transmission may be determined based on a TA compensation gap $G_{TA}$.

When the UE adjusts its TA configuration by increasing it by $\Delta TA$, e.g. to compensate for repetitions which are determined to be arriving late, an uplink transmission using the updated TA configuration would be transmitted earlier (by $\Delta TA$) compared to using the previous TA configuration. The timing of the repetition may thus collide with the timing of the previous repetition. In the example of FIG. 10 (and FIG. 9), illustrating this situation, the UE determines an initial TA value $TA_0$ to transmit its uplink repetitions and at the $N_{TA}^{th}$ PUSCH repetition, the UE applies a TA compensation $\Delta TA$, thereby transmitting PUSCH #$N_{TA}$ at an earlier time compared to using the previous TA value (e.g. at time $t_0$ instead of $t_7$ in FIG. 9). This start of the uplink transmission overlaps with an end portion of the previous repetition (e.g. during $t_6$ and $t_7$ PUSCH #$N_{TA}$-1 and PUSCH #$N_{TA}$ collide in FIG. 9).

In order to determine which repetition will be cancelled, if it is determined that one will be cancelled, a TA compensation gap $G_{TA}$ can be used by the terminal. The gap can be located at a time window which is around the time when the terminal switches from the previous TA value to the updated TA value, e.g. near the time when $\Delta TA$, the TA compensation, is applied. For example, $G_{TA}$ can be defined respective to the original timing of the $N_{TA}^{th}$ repetition (or of every $N_{TA}^{th}$ repetitions if repeated every $N_{TA}$ repetitions), such as just before, during the $N_{TA}^{th}$ repetition and/or after this repetition.

In an example implementation, the TA compensation gap $G_{TA}$ may be created prior to the first repetition where the new TA configuration will be used (where $\Delta TA$ is applied). That is, $G_{TA}$ is located prior to $N_{TA}^{th}$ repetition. In another example implementation, the TA compensation gap $G_{TA}$ may be located near the first repetition where the new TA configuration will be used (where $\Delta TA$ is applied). That is, $G_{TA}$ is located after the $N_{TA}^{th}$ repetition.

Based on the TA compensation gap $G_{TA}$, the terminal can determine to cancel (or delay as discussed below) the transmission of one or more repetitions before the first repetition with the new TA configuration (e.g. value) is used.

It should also be noted that in some cases, only part of a repetition might be cancelled. For example, some symbols in the subframe for transmitting the repetition may not be transmitted while others might be transmitted. Such a partial repetition may still be used to perform symbol combining with the other repetitions received at the base station. For example, in some cases an end portion of a repetition may be cancelled (e.g. at least the portion of PUSCH #$N_{TA}$-1 between $t_6$ and $t_7$ in FIG. 9), a beginning portion of a repetition may be cancelled (e.g. at least the portion of PUSCH #$N_{TA}$ between to and $t_7$ in FIG. 9). The same techniques of cancelling only part but not all of a repetition can also be used in cases where the distance between the terminal and NTN node is decreasing.

FIG. 10 illustrates an example of changes in transmission timing at a terminal, corresponding to an example similar to that of FIG. 9. In this example, TA compensation $\Delta TA$ is applied from and on PUSCH #$N_{TA}$. To avoid collision between the time windows for PUSCH #$N_{TA}$-1 and PUSCH #$N_{TA}$, a TA compensation gap $G_{TA}$ is created (in this case for the duration of a repetition and by cancelling the previous repetition, PUSCH #$N_{TA}$-1, thereby allowing PUSCH #$N_{TA}$ to be transmitted earlier (by $\Delta TA$) without causing collision.

It should be appreciated that although in this example the duration of $G_{TA}$ is 1 subframe (which is expected to be the duration of a PUSCH repetition in current systems), any other $G_{TA}$ duration, such as the duration of a portion of a subframe or more than a subframe, such as multiple subframes or multiple subframe portions. In some examples, the terminal may use at least some of the duration of the gap $G_{TA}$ to carry out a localisation procedure, e.g. GNSS measurement, which can assist with the updating of the TA value to be used by the terminal (e.g. to determine $\Delta TA$ or to determine the new TA value directly).

Figure 11:
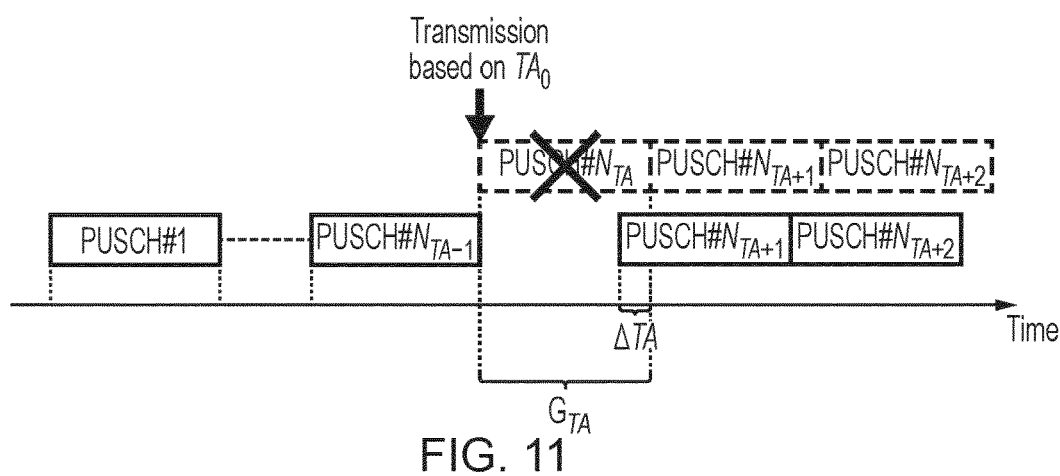
FIG. 11 illustrates another example of changes in transmission timing at a terminal.

FIG. 11 illustrates an example of changes in transmission timing at a terminal, corresponding to an example similar to those of FIGS. 9 and 10. In this example, the principles discussed above are also applied and the repetition selected to be cancelled is PUSCH #$N_{TA}$. Said differently, in one example, the last repetition to be sent with the previous TA value is cancelled and in the other example, the first repetition to be sent with the updated TA value is cancelled. If the concept of gap is used, in one case the gap is before the new TA value is used and in the other case, the gap starts at a time when the new value becomes effective and/or after the last repetition with the previous TA value. The teachings provided above otherwise apply equally to this example and PUSCH #$N_{TA}$ is cancelled while PUSCH #$N_{TA}$+1 is the first repetition sent with the new TA value. In a case where the NTN node has been detected as being further away from the terminal, the first repetition which is sent with the new TA configuration (e.g. PUSCH #$N_{TA}$−+1) is sent earlier than originally scheduled with the previous TA value, by an amount corresponding to ΔTA.

In both cases and in implementations where at least a portion of a repetition is cancelled, the gap can be seen as helpful to determine which repetition(s) to select for the cancellation. For example, it can be seen as a time window where repetitions falling within this window will be cancelled. For example, a repetition which falls fully within the gap can be cancelled, a repetition of an uplink transmission that starts in the window will be cancelled, a repetition of an uplink transmission that ends in the window will be cancelled, etc. For example, the (non-limiting) examples of FIGS. 10 and 11 can correspond to the application of a selection criterion of a repetition falling fully within the gap and/or ending during the gap.

Figure 12:
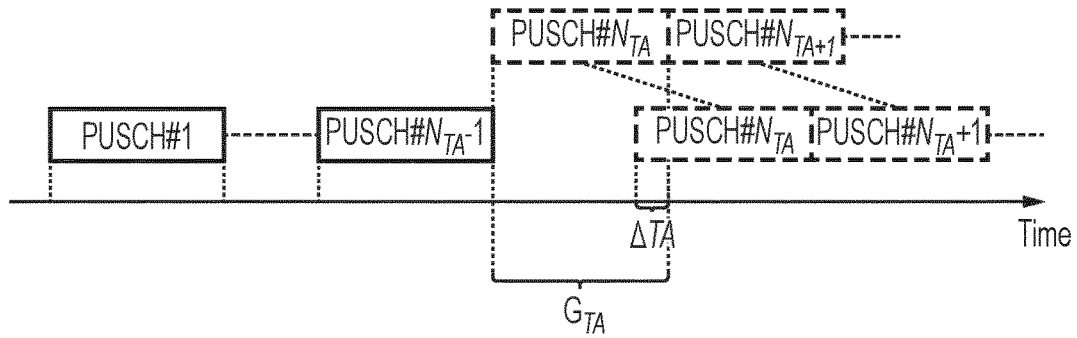
FIG. 12 illustrates a further example of changes in transmission timing at a terminal.

FIG. 12 illustrates a further example of changes in transmission timing at a terminal in a case where the distance between the NTN node and the terminal increases. In this example, the transmission timing for the repetitions is updated without cancelling the transmission of a repetition. Once the terminal determines the new timing advance configuration, e.g. after $N_{TA}$ repetitions transmitted, the terminal can delay the start of a repetition based on the TA value so that the next repetition sent after the gap created by the delay can be sent with the new TA configuration. In the example of FIG. 12, instead of sending PUSCH #$N_{TA}$ immediately after PUSCH #$N_{TA}$−1 (as would be expected without changes to the TA value), the terminal will delay the transmission so that it is sent at the next sub-frame, at a time ΔTA earlier compared to the previous TA subframe start.

From one perspective, the delay of an uplink transmission may be determined based on a TA compensation gap $G_{TA}$. The gap is introduced to accommodate a change in TA configuration and the terminal can delay one or more repetitions based on the compensation gap. For example in FIG. 12, the terminal can determine that PUSCH #$N_{TA}$ would fall completely within the gap or would end within the gap and will therefore be delayed. The repetition can be delayed until the next sub-frame transmission starting point based on the new timing advance value.

It will be appreciated that, in such cases where the NTN node is moving away from the terminal and the TA increases, with the techniques above, the base station will also find a gap in the received repetitions. For example in FIG. 9, the base station will receive a repetition for the subframe for PUSCH #$N_{TA}$−2 (arriving with some accumulated delays due to TA configuration becoming out-of-date), will not receive a repetition in the sub-frame that would otherwise be associated with PUSCH #$N_{TA}$−1 and will receive a repetition for the sub-frame for PUSCH #$N_{TA}$. The same situation would happen for FIG. 10 and a similar situation would happen for FIG. 11. The base station may be configured to determine whether the terminal had to delay the transmission of a repetition to accommodate a longer TA configuration (as a selected repetition would not be received in the expected sub-frame). In some cases, this may be based on the base station determining after how many repetitions the terminal will update its TA configuration. In a case where a repetition is fully or partially cancelled, e.g. when the TA value has increased, the terminal may then be able to transmit the remainder of the repetitions within the originally allocated resources. It is however also conceivable that the terminal might delay the remaining repetitions, without cancellations and therefore use more of the base station sub-frames (e.g. compared to cases where the timing advance reduces or does not change substantially). This can be handled using one or more techniques, such as the base station determining that delayed repetition transmissions are expected in the transmission of the series of repetitions (e.g. making its own determination regarding expected TA changes using at least the path (e.g. position, speed and direction of the NTN node). In some cases, it may also reserve additional resources as a precaution, compared to the resources explicitly allocated to the terminal. Such techniques can enable the system to accommodate one or more TA updates throughout the transmission of the repetitions. In another example, the base station may explicitly allocate additional resources that the terminal may use, if needed, based on the modifications to the TA configuration.

These teachings are also applicable for cases where the NTN node (e.g. satellite) is getting closer to the UE, i.e. cases where the distance between the NTN node and the UE is decreasing. In such cases, a repetition may be delayed or cancelled based on a new timing advance configuration.

Figure 13:
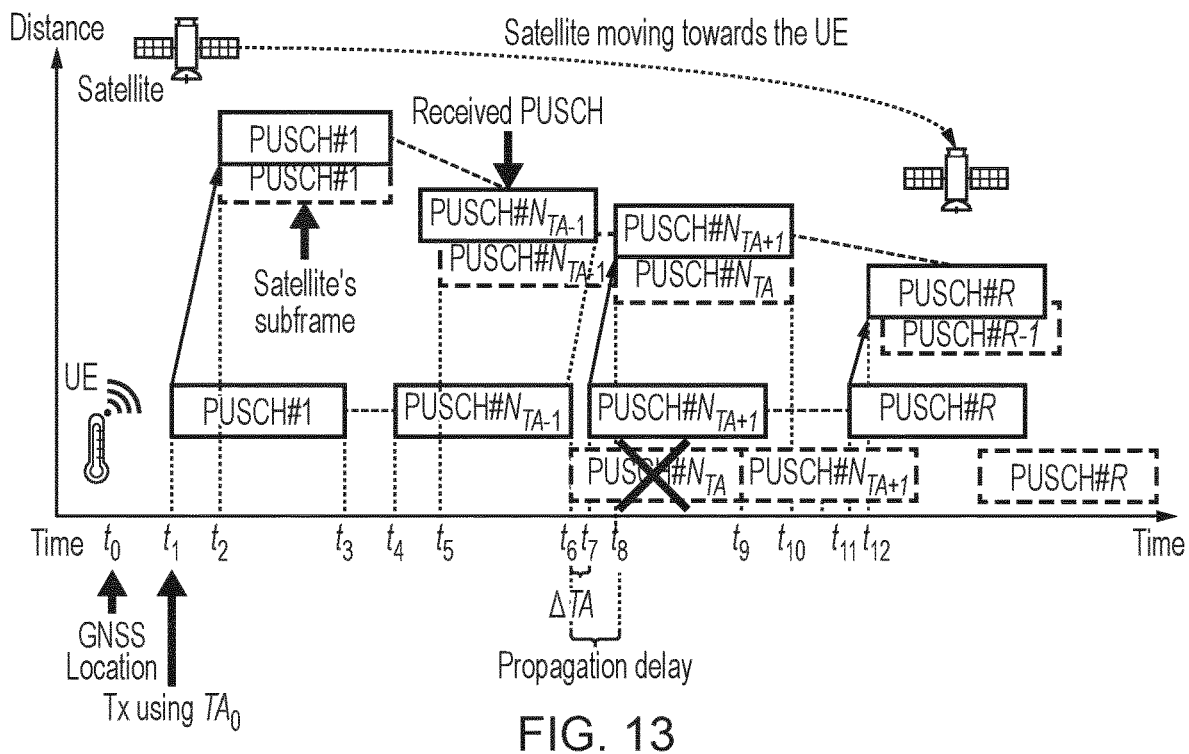
FIG. 13 illustrates another example of adjusting transmission parameters for transmitting repetitions in an NTN system.

FIG. 13 illustrates another example of adjusting transmission parameters for transmitting repetitions in an NTN system where the distance between the NTN node and the terminal (UE) is reducing and keeps reducing at each repetition. The UE first determines an initial TA value, $TA_0$, for example using GNSS measurements and applies it for first one or more repetitions, e.g. starting with PUSCH #1. At PUSCH #$N_{TA}$, the UE adjusts its TA parameter from value $TA_0$, by applying a TA compensation element ΔTA, thereby obtaining a new value $TA_1$ for the TA parameter. From PUSCH #$N_{TA}$, the UE can use the updated TA value $TA_1$ which will in this case result in a transmission ΔTA later than with the previous TA value, e.g. by transmitting a repetition at time $t_7$ instead of time $t_0$ (which would be used if it were to use the previous TA value $TA_0$). Additionally, the terminal will identify a repetition to cancel (or delay) in order to facilitate the adjustment of the transmission times. These adjustments enable PUSCH #$N_{TA}$ and subsequent repetitions after that (if transmitted/not cancelled) to arrive more closely aligned with the satellite's subframe boundaries, rather than arriving early. In this example, PUSCH #$N_{TA}$ is cancelled such that after PUSCH #$N_{TA}$−1, the next repetition to be sent will be PUSCH #$N_{TA}$+1.

While the terminal might send R repetitions which would be received by the NTN node (see for example FIG. 16), by cancelling a repetition when an additional delay is added, this can help the terminal limit the time duration it will remain awake, especially if the terminal is continuously getting closer and as the reduction in TA and delay correction are accumulating.

Figure 14:
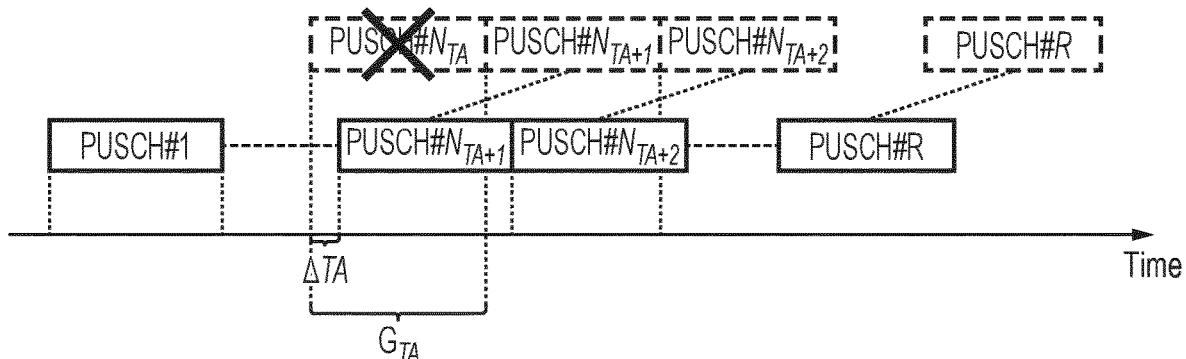
FIG. 14 illustrates another example of changes in transmission timing at a terminal.

FIG. 14 illustrates another example of changes in transmission timing at a terminal corresponding to a situation where the distance between the NTN node and the terminal is decreasing such that the timing advance after adjustment will be less than before adjustment (i.e. would be associated with a later transmission time. As discussed above, one (or more) of the repetitions is cancelled and the timing advance parameter is adjusted based on the new timing advance. In this example, the first repetition PUSCH #$N_{TA}$ of the repetitions associated with the new timing advance is cancelled and after a delay of ΔTA (as the repetitions are being sent later), the next repetition PUSCH #$N_{TA}$+1 is transmitted. It will be appreciated that, as discussed above, in some cases the last repetition associated with the previous TA parameter PUSCH #$N_{TA}$−1 can be cancelled instead (or in addition to PUSCH #$N_{TA}$) such that PUSCH #$N_{TA}$ (or PUSCH #$N_{TA}$+1, respectively) will be the next repetition transmitted, with an additional delay of ΔTA relative to the previous transmission time based on the previous timing advance.

Figure 15:
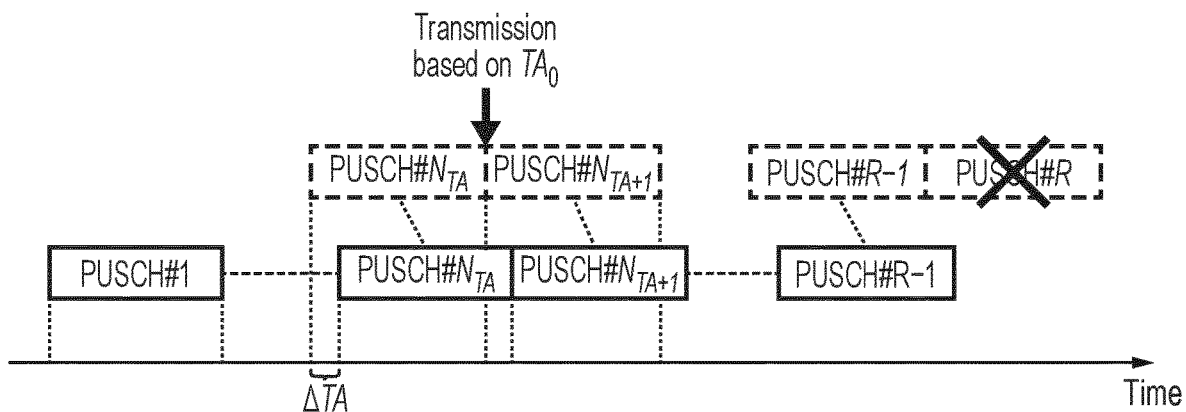
FIG. 15 illustrates a further example of changes in transmission timing at a terminal.

It will also be appreciated that in some cases the repetition to be deleted can be selected as the last repetition of the series of repetitions that has not yet been cancelled. For example, FIG. 15 illustrates an example of changes in transmission timing at a terminal according to this example. This example shows a case where the NTN node is getting closer to the terminal but the same principle can be applied to when the NTN is getting further away from the terminal. In this example, the first repetition to be transmitted with the new timing advance configuration can be transmitted at the first appropriate time based on the new TA value and which does not overlap with a time window for transmitting a previous repetition and the last remaining repetition may be cancelled instead. Additionally, as will be appreciated, the arrangement of FIGS. 14 and 15 are equivalent to one another in cases where the repetitions correspond to identical transmissions.

Figure 16:
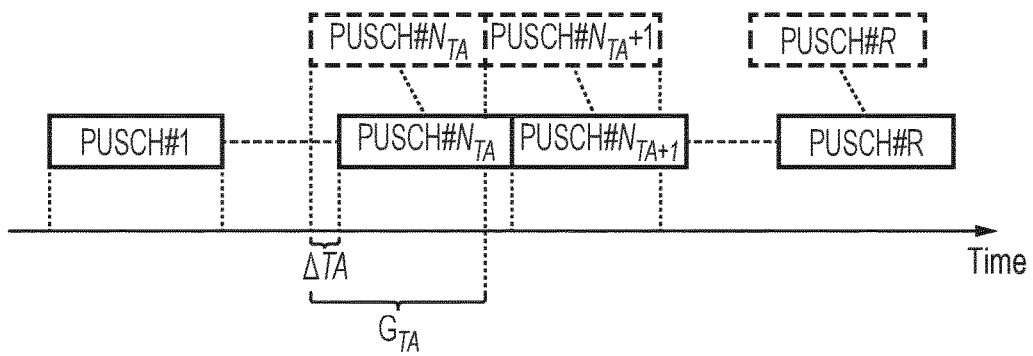
FIG. 16 illustrates yet another example of changes in transmission timing at a terminal.

While the transmission of a partial or full repetition may be cancelled in cases where the timing advance is reducing in value, it is expected that the terminal will delay the transmission of the next repetition without applying any cancellation. FIG. 16 illustrates another example of changes in transmission timing at a terminal corresponding to a situation where the distance between the NTN node and the terminal is decreasing. As will be appreciated, in this case, the terminal can delay the transmission of the first repetition associated with the new timing advance (PUSCH #$N_{TA}$) by ΔTA such that the sub-frame for that repetition will be expected to arrive at the base station aligned with the timing for that sub-frame at the base station.

It will be appreciated that in this case, the delaying of the repetition is not expected to result in the base station having a sub-frame for which no transmission is received (see discussion above). Accordingly, the base station may be configured to determine that the terminal was able to update its TA configuration without "missing" a sub-frame or repetition (e.g. by change to a substantially identical or smaller TA value, rather than a greater TA value).

It will be appreciated that in some cases, the terminal may be configured (i) to delay repetitions in all cases, (ii) to cancel (at least partially) at least a repetition in all cases, or (iii) to only delay repetitions in cases the timing advance reduces in value and to cancel (at least partially) one or more repetitions in cases where the timing advances increases in value.

It should be noted that in all of the examples provided herein, the alignment between the repetitions received at the NTN node and the corresponding time window for receiving the transmission may not be fully aligned, even after adjustment. This may be due for example to, amongst other things, inaccuracies in the determination of the new timing advance configuration and/or due to further changes in the distance between the terminal and satellite. Accordingly, not all repetitions transmitted with the updated timing advance will necessarily arrive exactly aligned with the corresponding time window at the NTN node. However, it will be expected that, even if some repetitions are not fully aligned, they will be better aligned (better aligned compared to a situation where the timing advance configuration is not updated). For example, by controlling and reducing the misalignment at the NTN node, the likelihood of the transmission failing can be reduced and the transmission is more likely to be successful, and potentially to be decoded earlier by the base station—whether the base station is co-located with the NTN node or not.

As will be appreciated, in some examples, in addition to applying two or more different TA compensation configurations during the transmission of a series of uplink repetitions, the UE may also apply a frequency compensation to adjust to the changes in Doppler shift as the satellite moves relative to the UE.

In some examples, the TA compensation gap $G_{TA}$ duration can predetermined, for example fixed in a standard or in device specifications. It may be defined in absolute terms (e.g. by its duration in ms) or in relative terms (e.g. by its duration with respect to another time period such as the current duration of a subframe, e.g. using a ratio factor). In some cases, the duration of the gap can be dependent on other parameters, such as the speed or location of the terminal, the speed or location of the NTN node and/or the value $N_{TA}$, indicating the number of repetitions associated with the previous TA configuration.

In some implementations, whether the TA compensation gap $G_{TA}$ is created prior to the repetition applying ΔTA (e.g. cancelling a previous repetition as in FIGS. 9-10 or delaying a previous repetition) or from the repetition applying ΔTA (e.g. cancelling a first repetition with the new TA value as in FIGS. 11 and 13-14 or delaying a first repetition with the new TA value as in FIGS. 12 and 16) or a repetition at the end of the series (e.g. cancelling the last repetition of the series which hasn't yet been selected for cancellation as in FIG. 15) can be configured by the network. It will be noted that the network may in some cases indicate a configuration selected from two of these three options, or from a plurality of options with the plurality of options comprising one or more of these three options.

In some instances, the TA compensation gap $G_{TA}$ duration and/or the number of repetitions associated with the current TA configuration before the TA configuration is updated (e.g. $N_{TA}$) is configured by the network, for example using RRC signalling and/or another type of signalling. It can be that in cases where the NTN node (e.g. satellite) is moving away or toward the user at a relatively greater speed, the number $N_{TA}$ of repetitions can be smaller than the number associated with a relatively smaller speed between the terminal and NTN node. Likewise, the gap duration may be adjusted depending on the relative speed between the terminal and NTN node. For example, in some cases, the terminal may determine that a longer gap should be provided for the terminal to carry out a localisation procedure (e.g. using a GNSS) before it can resume the transmission of the repetitions. In many cases, the network is expected to be aware of the orbital paths and speed of the satellite and/or of the delay tolerance the base station can accept when receiving the UE transmission. Any combination of these may be used to determine the gap duration and/or repetition number. This configuration can for example be defined per satellite, as each satellite may have different speed and orbital path. More generally, each of the number of repetitions (e.g. $N_{TA}$) or duration of use of a timing advance configuration before update and the timing advance value may be based on one or a combination of a location of the NTN node, a travel direction of the NTN node, a speed of the NTN node, a location of the base station, a delay tolerance the base station, a location of the terminal, a travel direction of the terminal and a speed of the terminal.

In another embodiment, the TA compensation gap $G_{TA}$ duration and/or the number of repetitions associated with the current TA configuration before the TA configuration is updated (e.g. $N_{TA}$) is indicated in the DCI, e.g. in an uplink grant allocating the resources for the series of uplink repetitions. This recognizes that the UE may be served by different satellites with different orbital paths and speeds and so indicating the gap duration and/or repetition number dynamically can help tailor the configuration to a particular satellite, if appropriate.

In some implementations, the TA compensation gap $G_{TA}$ duration can be based on one or more UE capabilities. For example, if a UE is expected to make measurements using the GNSS in order to determine the new timing advance, e.g. by determining $\Delta TA$, then a longer $G_{TA}$ duration may be desired. On the other hand, if the UE can estimate $\Delta TA$ without any measurements, then a shorter $G_{TA}$ duration can be used.

In another implementation, the TA compensation gap $G_{TA}$ can be created within the Uplink Compensation Gap (UCG) when the UCG is provided. The UCG is defined for HD-FDD eMTC or NB-IOT devices, where the UCG is used to allow a UE to maintain frequency and time synchronization under a long set of uplink repetitions. Here the $G_{TA}$ can be configured to fall within the UCG (and optionally, additional gaps may be provided additionally) so that the UE can apply $\Delta TA$ for the repetition after UCG. For example, the terminal can delay repetitions which would have otherwise fallen within the UCG (see above, based on a start time, end time or complete inclusion within the gap). At the end of the UCG, the next non-cancelled repetition is sent at the first opportunity which is (1) outside the UCG and (2) using the new TA configuration. For example, the terminal can use the UCG to update its TA configuration (e.g. if it determines that the next TA reconfiguration will be scheduled before the next UCG) and if the next repetition using the new TA value would fall within the UCG, the terminal can delay the transmission until the next opportunity according to the new TA value.

In some cases, $N_{TA}$ may be predetermined or pre-configured based on a pre-agreed implementation (e.g. a standard). In other cases and as mentioned above, it may be determined based on one or more parameters. $N_{TA}$ may be defined in terms of a number of repetitions or in units of time, e.g. by an amount measured in ms. The UE can work out on which repetitions the current TA may be applied and on which repetition the TA compensation will first be applied. This can in some cases involve rounding up or rounding down to the nearest repetition.

As mentioned above, the value $N_{TA}$ can dependent upon the speed of the satellite relative to the UE. For example, it can be configured to correspond to a time (or to less than a time) it takes for the distance between the UE and the satellite to change by such a level that the shifting of the repetition might be too great to recover. For example, if the distance between the UE and satellite is expected to have increased to such a level that, using the current (before update) TA, the uplink repetitions would then arrive too late relative to the satellite's subframe, e.g. beyond the CP (cyclic prefix), it would be undesirable and $N_{TA}$ might be configured to avoid such a situation by updating the TA configuration before the distance increases too much (or likewise, reduces too much).

The value $N_{TA}$ may be calculated by the UE. The UE can for example use received information of the satellite position, velocity and/or orbital path, which can be used to determine $N_{TA}$. The UE may signal its determined $N_{TA}$ to the eNB.

Alternatively, $N_{TA}$ may be configured by the network, e.g. using RRC signalling. In this example, the base station (e.g. the eNB or gNB) decides the level of delay in the arrival of the uplink transmission relative to the subframe boundary that it can tolerate and using the satellite's orbital information, determines the value $N_{TA}$ accordingly and notifies the terminal of the configuration to use. In some cases, rather than using RRC signalling (or in addition), $N_{TA}$ is indicated in downlink control information. This may for example be in the DCI, such as the DCI used to schedule the uplink transmission (e.g. using legacy system procedures, such as an uplink Grant for the series of uplink repetitions or a downlink Grant for both downlink data from the base station and the corresponding HARQ ACK uplink transmission).

As mentioned above, within a repetition series, the terminal may use different values for $N_{TA}$. In some examples, $N_{TA}$ can be derived from a defined a set of values, e.g. $N_{TA}=\{N_{TA1}, N_{TA2}, N_{TA3}\}$, where the UE determines and applies a TA compensation from the $N_{TA1}^{th}$ repetition, another TA compensation from the $(N_{TA1}+N_{TA2})$th repetition and a last TA compensation from the $(N_{TA1}+N_{TA2}+N_{TA3})$th repetition. It will be appreciated that less or more than three values might equally be included in the set.

Now turning to the TA compensation factor $\Delta TA$ that is applied to a previous TA and/or to the new TA value to be applied, it should first be appreciated that the adjustment for every new set of repetitions (associated with a new TA value) can be different, e.g. different for every $N_{TA}$ repetitions. For example, after the $1^{st}$ $N_{TA}$ repetitions $\Delta TA_1$ is applied such that $TA_1=TA_0+\Delta TA_1$ and the $2^{nd}$ $N_{TA}$ repetitions, $\Delta TA_2$ is applied such that the $TA_2=TA_0+\Delta TA_1+\Delta TA_2$ and so on. The $\Delta TA$ is based on the speed of the satellite and its path. As mentioned above, it will be appreciated that in some cases, $TA_1$ and $TA_2$ might be calculated directly rather than through the intermediary of a correction or compensation factor.

It will also be appreciated that a satellite may have a different speed relative to the UE at different times such that for the same satellite, different $\Delta TA$ adjustments (or different variations levels between $TA_i$ and $TA_{i+1}$ if the compensation factor is not calculated directly) may be applied at different times. It should also be noted that the distance between the terminal and NTN node might decrease and then increase such that the TA may decrease and then increase (which would result in a compensation factor $\Delta TA$ which would change from negative to positive), as the satellite may pass by the UE, e.g. as it moves towards the UE at first and then moves away from the UE.

In an embodiment, the UE estimates the TA compensation $\Delta TA$ based on satellite speed and orbital path. The speed and/or path information for the NTN node might be received from the network, e.g. via the base station or otherwise (e.g. using a file including such satellite information for one or more satellites).

In another embodiment, the TA compensation $\Delta TA$ is configured by the network, e.g. via RRC signalling. In this case, this may be configured together with the $N_{TA}$ value (if it is configured by the network as well). For example, the base station may be configured to determine a level of delay within the subframe the base station can tolerate and derive the $\Delta TA$ to be applied based on this. In another embodiment, the TA compensation $\Delta TA$ can be signalled to the UE using downlink control information, e.g. using a DCI. The eNB can signal the $\Delta TA$ value to the UE in the UL Grant (for an uplink series of repetitions) or DL Grant (for the uplink acknowledgement of the downlink transmission, where the uplink acknowledgement is sent as repetitions).

In some examples and as alluded to above, the TA compensation ΔTA and/or new adjusted TA value may be measured by the UE. For example, the UE may use GNSS measurement to determine the adjustment ΔTA or the adjusted TA. As, this approach requires time for the UE to measure GNSS, so for such an embodiment a long $G_{TA}$ duration configuration may be required. While this technique is likely to increase transmission time and power consumption, it will be appreciated that it is expected to provide more up-to-date localisation information and thus provide a more accurate TA calculation.

As noted above, in some cases the compensation factor ΔTA may be determined first and the new TA value may be derived from it while in other cases, the new TA value may be determined directly and optionally, the compensation factor ΔTA can be derived from $TA_1$ and $TA_2$.

The discussion above has focused on having the repetitions arriving at the NTN node in a way which is synchronised with the timing at the NTN node. However, it will be appreciated that in examples where the base station is not co-located with the NTN node, the repetitions will have to arrive at the base station in a synchronised manner. The same techniques may be applied, where the location of the base station may also in some example be taken into account when determining a TA advance parameter or compensation (whether it is determined by the terminal and/or base station).

While the examples above have focused on uplink data transmissions (e.g. using PUSCH transmission in legacy systems), the same techniques are equally applicable to other uplink repeated transmissions. For example, they may be applied to uplink control transmissions (e.g. PUCCH transmissions, such as for the transfer of ACK/NACK information), uplink access transmissions (e.g. PRACH transmissions), etc.

Figure 17:
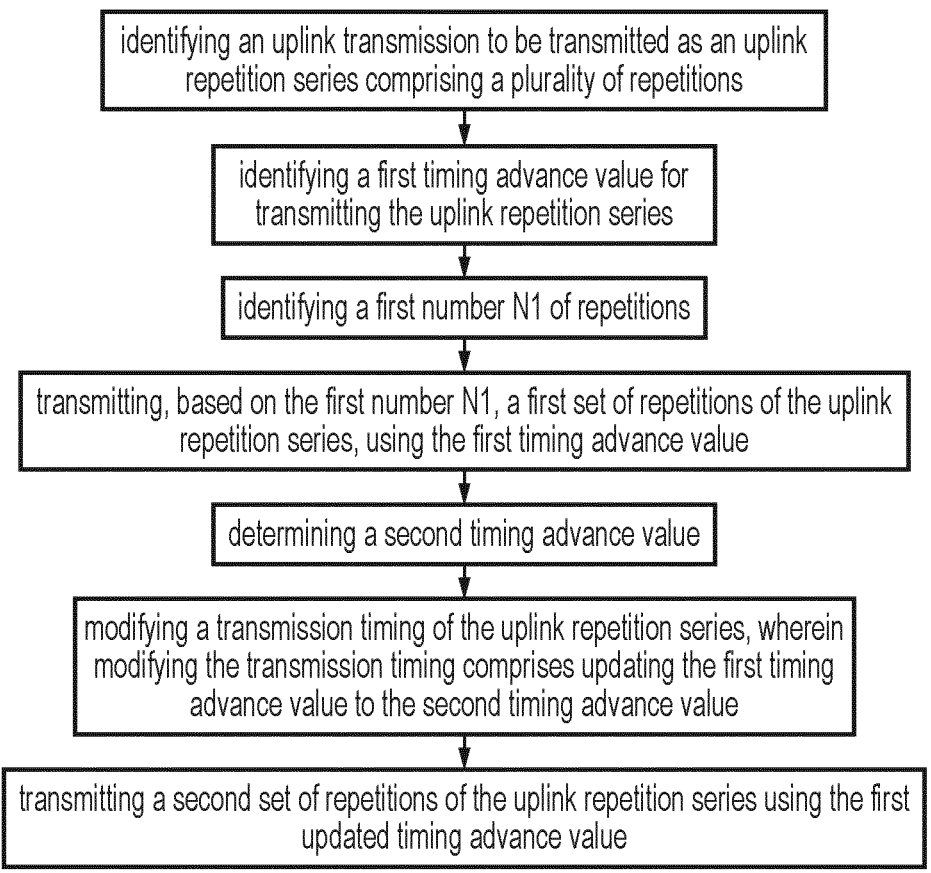
FIG. 17 illustrates an example method of operating a terminal.

FIG. 17 illustrates an example method of operating a terminal in a non-terrestrial network "NTN" in a telecommunication system, the system comprising the terminal, an NTN node and a base station, wherein the terminal is configured to communicate with the base station via the NTN node. The method comprises identifying an uplink transmission to be transmitted as an uplink repetition series comprising a plurality of repetitions and identifying a first timing advance value for use as a current timing advance value for transmitting the uplink repetition series. This may be based on GNSS measurement or equivalent and/or on data received from the base station regarding the NTN node. The TA is estimated with a view to having the repetitions transmitted arriving aligned with their expected arrival timings or time windows at the base station. The terminal also identifies a first number $N_1$ of repetitions. As discussed above, this may be based on a time parameter or on a number of repetitions parameter (e.g. preconfigured or configured by the network, such as by the base station via control signalling). In some cases, the terminal may first determine a time period after which it will update its timing advance configuration and the position or number of the repetitions which will be cancelled or delayed can for example be derived from the time period (thereby effectively deriving $N_1$).

The terminal transmits, based on the first number $N_1$, a first set of repetitions of the uplink repetition series, using the first timing advance value. For example, the first set of repetitions includes $N_1$ or $N_1-1$ repetitions. The terminal also determines a second timing advance value. This may be done by determining a timing advance compensation factor and applying the compensation factor to the first timing advance value to derive the new/second timing advance value.

The terminal modifies a transmission timing of the uplink repetition series, wherein modifying the transmission timing comprises updating the current timing advance value to the second timing advance value. It will be appreciated that in some cases this step will be combined with the previous one as the second timing advance value can be derived as the first timing advance value is updated to the second timing advance value.

Optionally, the terminal may also cancel the transmission of a selected first repetition of the uplink repetition series. This repetition may be from the first set (in which case the full first set of repetitions will not be sent, but only a partial set) or it may be from the second set (in which case the full first set of repetitions will not be sent, but only a partial set). In some cases, where more than one repetition is cancelled, at least one may be from the first set and at least one may be from the second set. In one example, the selected first repetition is the last repetition of the first set of repetitions or the first repetition of the second set.

The terminal also transmits a second set of repetitions of the uplink repetition series using the updated timing advance value corresponding to the second TA value. As will be appreciated based on the discussion above, the transmission of one or more repetitions of the second set may be cancelled, to facilitate the timing adjustment for the uplink transmissions with a view to reduce disruption as the timing advance varies as the repetitions are transmitted (in a system originally designed to use the same TA configuration throughout). In other cases, the transmission of a repetition of the second set may be delayed compared to the transmission based on the previous timing advance value.

In some cases, modifying the transmission timing of the uplink repetition series can comprise delaying the start of the transmission of the second set of repetitions relative to the start of the transmission of the second set of repetitions when using the first timing advance value.

Modifying the transmission timing of the uplink repetition series may comprise introducing or creating a time gap between the first set of repetitions and the second set of repetitions.

In one example, the time gap is introduced by delaying the start of the transmission of the second set of repetitions relative to the start of the transmission of the second set of repetitions when using the first timing advance value. For example, the time gap may be introduced by cancelling at least part of a selected repetition of the first set of repetitions or at least part of a selected repetition of the second set of repetitions. The selected repetition of the first set of repetitions may be the last repetition of the first set of repetitions and/or the selected repetition of the second set of repetitions may be the first repetition of the second set of repetitions. Cancelling at least part of the selected repetition comprises one or more of: cancelling a portion of the selected repetition; cancelling the selected repetition in full; cancelling an end portion of the selected repetition; cancelling an end portion of the selected repetition and a subsequent repetition after the selected repetition; cancelling a start portion the selected repetition; and cancelling a start portion of the selected repetition and a previous repetition before the selected repetition.

The number $N_1$ is based one or more parameters used for identifying the first timing advance value, such as a speed or path of the NTN node, or a delay tolerance capacity of the base station. For example, if these parameters indicate that the distance for the timing advance may vary quickly and/or that the base station has a relatively low delay tolerance, $N_1$ can be selected to be smaller (to update the TA configuration earlier) than if the distance varies more slowly and/or if the NTN has a relatively higher delay tolerance.

Cancelling or delaying the transmission of the selected first repetition may comprise determining whether the second timing advance value is greater than the first timing advance value; and if it is determined that the second timing advance value is greater than the first timing advance value, selecting a repetition of the repetition series as the selected first repetition to be cancelled or delayed. Using the techniques disclosed herein, a greater timing advance would mean adjusting the transmission of repetitions of the second set forward compared to the TA configuration used for the first set, such that cancelling or delaying a repetition can help adjust the timing while reducing collisions. In some cases, the cancelling is only performed if the second timing advance value is greater than the first timing advance value and not if the second timing advance value is smaller than—or smaller than or equal to—the first timing advance value.

In other cases, the cancelling and/or delaying is performed regardless of whether the second timing advance value is greater than, equal to or smaller than the first timing advance value.

In some implementations, based on the first number of transmissions, the terminal can identify a gap time period wherein the selected first repetition is selected based on the gap time period. For example, the gap may be a gap duration and start or terminate at the end of the last repetition of the first set. The gap may then be used for example by selecting the first repetition based on a start time, an end time or a total duration of a transmission window for the selected first repetition falling within the gap time period.

As discussed above, the process may be repeated more than once throughout the transmission of all repetitions. For example, the terminal can identify a second number $N_2$ of repetitions, wherein the transmitting of the second set of repetitions is based on the second number $N_2$; determine a third timing advance value; modify the transmission timing of the uplink repetition series by updating the current timing advance value to the third timing advance value; and transmit a third set of repetitions of the uplink repetition series using the current updated timing advance value, i.e. the third timing advance value. As mentioned above, the second number $N_2$ of repetitions may be less than, equal to or more than the first number $N_1$ of repetitions.

The skilled person will also appreciate that these techniques may be applied to an arrangement where the NTN node and base station are not co-located or to an arrangement where the base station and NTN node are partially or fully co-located.

Figure 18:
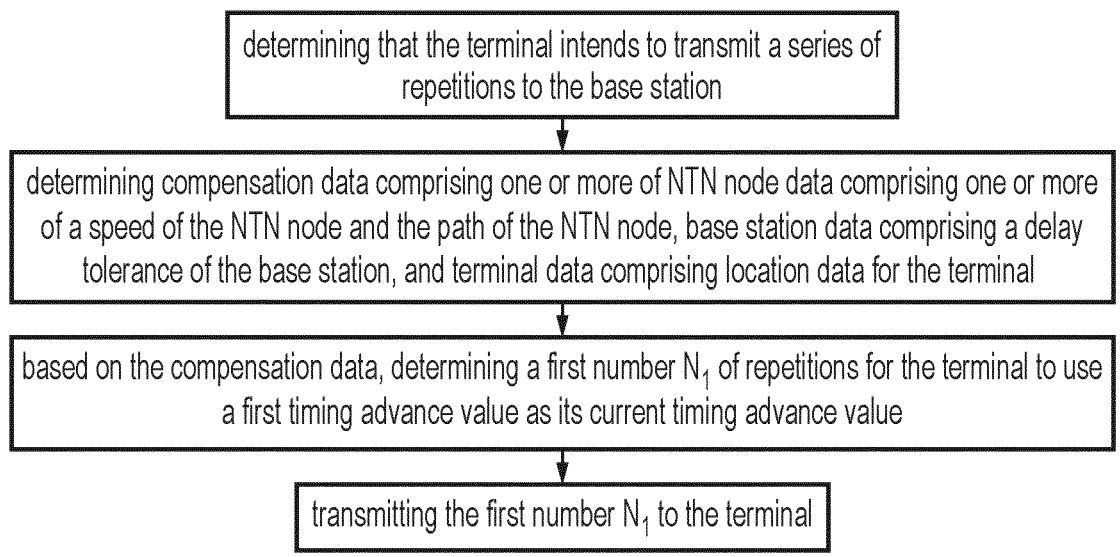
FIG. 18 illustrates an example method of operating a base station.

FIG. 18 illustrates an example method of operating a base station in a non-terrestrial network "NTN" in a telecommunication system, the system comprising a terminal, an NTN node and the base station, wherein the terminal is configured to communicate with the base station via the NTN node. The method comprises the base station determining that the terminal intends to transmit a series of repetitions to the base station. The base station can determine compensation data comprising one or more of NTN node data comprising one or more of a speed of the NTN node and the path of the NTN node, base station data comprising a delay tolerance of the base station, and terminal data comprising location data for the terminal. Based on the compensation data, the base station can determine a first number $N_1$ (e.g. $N_{TA}$ or related number) of repetitions for the terminal to use a first timing advance value as its current timing advance value.

Once the first number has been determined, it can be transmitted to the terminal. Accordingly, the base station can control how often the terminal will update its timing advance during the transmission of a series of repetitions and will also be aware of when the terminal might delay or cancel the transmission of one or more repetitions of the series.

In some cases, the base station can determine a gap duration; transmit to the terminal an indication of the determined gap duration; and receive the repetition series based on the first number $N_1$ and the gap duration. For example, the base station may configure a relatively long gap for the terminal to obtain location information (e.g. for cases where it determines that the terminal will perform a locations procedure to obtain location information for the terminal) and can adjust the times at which it is expected to receive future repetitions based on the insertion of the gap (which will be dependent on the first number, e.g. regarding the start of the gap, and the duration, e.g. regarding the end of the gap) within the transmission of the repetitions.

In some examples, the base station can determine that, when the current timing advance value of the terminal increases, the terminal will perform an action selected from delaying the transmission of a repetition and cancelling the transmission of a repetition; transmit to the terminal an indication of the selected action; and receive the repetition series based on the first number $N_1$ and the selected action. For example, depending on whether the repetitions were affected by a delay or by a cancellation, the base station will expect a different number of repetitions to be received from the terminal.

In some implementations, the base station can detect, based on the first number $N_1$, that one repetition of the repetition series has not been received in the allocated timeframe. For example, it may detect that no signal appears to have been received in a sub-frame for which a repetition was expected. Upon detecting that the one repetition has not been received in the allocated timeframe, determining that the terminal has cancelled or delayed a transmission in response to an increased timing advance value. The base station can thus derive from the absence of a repetition in that subframe that the terminal has either delayed or cancelled a repetition as a result of an increase in the timing advance.

It will be appreciated that while the present disclosure has been provided in the context of current systems and terminology, it is not limited to these particular examples. For examples, any reference to a PDSCH may be understood as a reference to a downlink transmission. References to a PUCCH or PUSCH may be understood as an uplink control or data transmission, respectively.

Likewise, references to GNSS may be understood as references to a positioning system and GNSS information as location or position information. DCI may be understood as downlink control information, e.g. comprising a downlink and/or uplink grant and sometimes also including configuration information for the corresponding scheduled downlink and/or uplink transmission(s).

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example, transmitting a message may involve using several resource elements in an LTE or NR environment such that several signals at a lower layer correspond to a single message at a higher layer. In addition, transmissions from one node to another may relate to the transmission of any one or more of user data, system information, control signalling and any other type of information to be transmitted. It will also be appreciated that some information may be notified or indicated implicitly rather than through the use of an explicit indicator.

Additionally, whenever an aspect is disclosed in respect of an apparatus or system, the teachings are also disclosed for the corresponding method and for the corresponding computer program. Likewise, whenever an aspect is disclosed in respect of a method, the teachings are also disclosed for any suitable corresponding apparatus or system as well as for the corresponding computer program. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example, any one or more of a mobile node or network node may be configured accordingly if appropriate, so long as it is technically feasible and not explicitly excluded.

Whenever the expressions "greater than" or "smaller than" or equivalent are used herein, it is intended that they disclose both alternatives "and equal to" and "and not equal to" unless one alternative is expressly excluded.

It will be appreciated that while the present disclosure has in some respects focused on implementations in an LTE network as such a network is expected to provide the primary use case at present, the same teachings and principles can also be applied to other wireless telecommunications systems. Thus, even though the terminology used herein is generally the same or similar to that of the LTE or 5G standards, the teachings are not limited to the present versions of LTE or 5G and could apply equally to any appropriate arrangement not based on 5G/LTE, for example any arrangement possibly compliant with any future version of an LTE, 5G or other standards—defined by the 3GPP standardisation groups or by other groups. Accordingly, the teaching provided herein using 3GPP, LTE and/or 5G/NR terminology can be equally applied to other systems with reference to the corresponding functions.

It will be appreciated that the principles described herein are applicable not only to certain types of communications device, but can be applied more generally in respect of any types of communications device. For example, while the techniques are expected to be particularly useful for NTN systems, the skilled person will appreciate that they can also be applied to other systems which for example face similar challenges and which are expected to benefit in a similar manner.

It is noteworthy that where a "predetermined" element is mentioned, it will be appreciated that this can include for example a configurable element, wherein the configuration can be done by any combination of a manual configuration by a user or administrator or a transmitted communication, for example from the network or from a service provider (e.g. a device manufacturer, an OS provider, etc.).

Techniques discussed herein can be implemented using a computer program product, comprising for example computer-readable instructions stored on a computer readable medium which can be executed by a computer, for carrying out a method according to the present disclosure. Such a computer readable medium may be a non-transitory computer-readable storage medium with an executable program stored thereon, wherein the program instructs a microprocessor to perform said method. Additionally, or alternatively, the techniques discussed herein may be realised at least in part by a computer readable communication medium that carries or communicates code in the form of instructions or data structures and that can be accessed, read, and/or executed by a computer.

In other words, any suitable computer readable medium may be used, which comprises instructions and which can for example be a transitory medium, such as a communication medium, or a non-transitory medium, such as a storage medium. Accordingly, a computer program product may be a non-transitory computer program product.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely examples of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Further examples of the present disclosure are set out in the following numbered clauses:

Clause 1. A method of operating a terminal in a non-terrestrial network "NTN" in a telecommunication system, the system comprising the terminal, an NTN node and a base station, wherein the terminal is configured to communicate with the base station via the NTN node, the method comprising:

identifying an uplink transmission to be transmitted in the uplink as an uplink repetition series comprising a plurality of repetitions;

identifying a first timing advance value for use as a current timing advance value for transmitting the uplink repetition series;

identifying a first number $N_1$ of repetitions;

transmitting, based on the first number $N_1$, a first set of repetitions of the uplink repetition series, using the first timing advance value;

determining a second timing advance value;

modifying a transmission timing of the uplink repetition series, wherein modifying the transmission timing comprises updating the current timing advance value to the second timing advance value; and transmitting a second set of repetitions of the uplink repetition series using the current timing advance value.

Clause 2. The method of Clause 1 wherein modifying the transmission timing of the uplink repetition series comprises delaying the start of the transmission of the second set of repetitions relative to the start of the transmission of the second set of repetitions when using the first timing advance value.

Clause 3. The method of Clause 1 or 2, wherein modifying the transmission timing of the uplink repetition series comprises introducing a time gap between the first set of repetitions and the second set of repetitions.

Clause 4. The method of Clause 3, wherein the time gap is introduced by delaying the start of the transmission of the second set of repetitions relative to the start of the transmission of the second set of repetitions when using the first timing advance value.

Clause 5. The method of Clause 3, wherein the time gap is introduced by cancelling at least part of a selected repetition of the first set of repetitions or at least part of a selected repetition of the second set of repetitions.

Clause 6. The method of Clause 5, wherein the selected repetition of the first set of repetitions is the last repetition of the first set of repetitions and/or wherein the selected repetition of the second set of repetitions is the first repetition of the second set of repetitions.

Clause 7. The method of Clause 5 or 6 wherein cancelling at least part of the selected repetition comprises one or more of:

cancelling a portion of the selected repetition;
cancelling the selected repetition in full;
cancelling an end portion of the selected repetition;
cancelling an end portion of the selected repetition and a subsequent repetition after the selected repetition;
cancelling a start portion the selected repetition; and
cancelling a start portion of the selected repetition and a previous repetition before the selected repetition.

Clause 8. The method of any one of Clauses 1 to 4, further comprising cancelling the transmission of a selected first repetition of the uplink repetition series.

Clause 9. The method of Clause 8 wherein the selected first repetition is the last repetition of the first set of repetitions or the first repetition of the second set.

Clause 10. The method of Clause 8 or 9, wherein cancelling the transmission of the selected first repetition comprises
determining whether the second timing advance value is greater than the first timing advance value; and if it is determined that the second timing advance value is greater than the first timing advance value, selecting a repetition of the repetition series as the selected first repetition to be cancelled.

Clause 11. The method of any one of Clauses 8 to 10, further comprising based on the first number of transmissions, identifying a gap time period wherein the selected first repetition is selected based on the gap time period.

Clause 12. The method of Clause 11, wherein the selected first repetition is selected based on a start time, an end time or a total duration of a transmission window for the selected first repetition falling within the gap time period.

Clause 13. The method of any preceding Clause, further comprising:

stopping transmission of the repetition series to carry out a localisation procedure to obtain location information for the terminal;
determining the second timing advance value based on the location information; and
resuming transmission of the repetition series by transmitting the second set of repetitions.

Clause 14. The method of any preceding Clause, wherein the first set of repetitions comprises $N_1$ repetitions or $N_1-1$ repetitions of the plurality of repetitions.

Clause 15. The method of any preceding Clause wherein the first number $N_1$ is based on one or more of a location of the NTN node, a travel direction of the NTN node, a speed of the NTN node, a location of the base station, a delay tolerance the base station, a location of the terminal, a travel direction of the terminal and a speed of the terminal.

Clause 16. The method of any preceding Clause further comprising determining a timing advance value change, wherein determining the second timing advance value comprises applying the timing advance value change to the first advance value.

Clause 17. The method of any preceding Clause, further comprising:

identifying a second number $N_2$ of repetitions, wherein the transmitting of the second set of repetitions is based on the second number $N_2$;
determining a third timing advance value;
modifying the transmission timing of the uplink repetition series by updating the current timing advance value to the third timing advance value; and
transmitting a third set of repetitions of the uplink repetition series using the third timing advance value.

Clause 18. The method of Clause 17, wherein the second number $N_2$ of repetitions is less than, equal to or more than the first number $N_1$ of repetitions.

Clause 19. The method of any preceding Clause, wherein the base station and NTN node are partially or fully co-located.

Clause 20. A method of operating a base station in a non-terrestrial network "NTN" in a telecommunication system, the system comprising a terminal, an NTN node and the base station, wherein the terminal is configured to communicate with the base station via the NTN node, the method comprising:

determining that the terminal intends to transmit a series of repetitions to the base station;
determining compensation data comprising one or more of:
NTN node data comprising one or more of a speed of the NTN node and the path of the NTN node, base station data comprising a delay tolerance of the base station, and terminal data comprising location data for the terminal;
based on the compensation data, determining a first number $N_1$ of repetitions for the terminal to use a first timing advance value as its current timing advance value; and
transmitting the first number $N_1$ to the terminal.

Clause 21. The method of Clause 20 further comprising:
determining a gap duration for the terminal to delay or at least partially cancel a selected repetition of the series of repetitions;
transmitting to the terminal an indication of the determined gap duration; and
receiving the repetition series based on the first number $N_1$ and the gap duration.

Clause 22. The method of Clause 20 or 21 further comprising:
based on determining that the terminal will perform a localisation procedure to obtain location information for the terminal, determining a gap duration for the terminal to carry out the localisation procedure and to delay or at least partially cancel a selected repetition of the series of repetitions based on the gap duration;
transmitting to the terminal an indication of the determined gap duration; and
receiving the repetition series based on the first number $N_1$ and the gap duration.

Clause 23. The method of any one of Clauses 20 to 22 further comprising:
determining that, when the current timing advance value of the terminal increases, the terminal will perform an action selected from delaying the transmission of a repetition and cancelling the transmission of a repetition;
transmitting to the terminal an indication of the selected action; and
receiving the repetition series based on the first number $N_1$ and the selected action.

Clause 24. The method of any one of Clauses 20 to 23 wherein the method comprises:
detecting, based on the first number $N_1$, that one repetition of the repetition series has not been received in the allocated timeframe;
upon detecting that the one repetition has not been received in the allocated timeframe, determining that the terminal has cancelled or delayed a transmission in response to an increased timing advance value.

Clause 25. A terminal for use in a non-terrestrial network "NTN" in a telecommunication system, the system comprising the terminal, an NTN node and a base station, wherein the terminal comprises a controller, a receiver and a transmitter configured to operate together to communicate with the base station via the NTN node, the controller, receiver and transmitter being further configured to operate together to:
identify an uplink transmission to be transmitted in the uplink as an uplink repetition series comprising a plurality of repetitions;
identify a first timing advance value for use as a current timing advance value for transmitting the uplink repetition series;
identify a first number $N_1$ of repetitions;
transmit, based on the first number $N_1$, a first set of repetitions of the uplink repetition series, using the first timing advance value;
determine a second timing advance value;
modify a transmission timing of the uplink repetition series, wherein the controller, receiver and transmitter being configured to operate together to modify the transmission timing comprises the controller, receiver and transmitter being configured to operate together to update the current timing advance value to the second timing advance value; and
transmit a second set of repetitions of the uplink repetition series using the current timing advance value.

Clause 26. The terminal of Clause 25 wherein the controller, receiver and transmitter being configured to operate together to modify the transmission timing of the uplink repetition series comprises the controller, receiver and transmitter being configured to operate together to delay the start of the transmission of the second set of repetitions relative to the start of the transmission of the second set of repetitions when using the first timing advance value.

Clause 27. The terminal of Clause 25 or 26, wherein the controller, receiver and transmitter being configured to operate together to modify the transmission timing of the uplink repetition series comprises the controller, receiver and transmitter being configured to operate together to introduce a time gap between the first set of repetitions and the second set of repetitions.

Clause 28. The terminal of Clause 27, wherein the time gap is introduced by delaying the start of the transmission of the second set of repetitions relative to the start of the transmission of the second set of repetitions when using the first timing advance value.

Clause 29. The terminal of Clause 27, wherein the time gap is introduced by cancelling at least part of a selected repetition of the first set of repetitions or at least part of a selected repetition of the second set of repetitions.

Clause 30. The terminal of Clause 29, wherein the selected repetition of the first set of repetitions is the last repetition of the first set of repetitions and/or wherein the selected repetition of the second set of repetitions is the first repetition of the second set of repetitions.

Clause 31. The terminal of Clause 29 or 30 wherein the controller, receiver and transmitter are configured to operate together to cancel at least part of the selected repetition comprises the controller, receiver and transmitter being configured to operate together to carry out one or more of:
cancel a portion of the selected repetition;
cancel the selected repetition in full;
cancel an end portion of the selected repetition;
cancel an end portion of the selected repetition and a subsequent repetition after the selected repetition;
cancel a start portion the selected repetition; and
cancel a start portion of the selected repetition and a previous repetition before the selected repetition.

Clause 32. The terminal of any one of Clauses 25 to 28, the controller, receiver and transmitter being further configured to operate together to cancel the transmission of a selected first repetition of the uplink repetition series.

Clause 33. The terminal of Clause 32 wherein the selected first repetition is the last repetition of the first set of repetitions or the first repetition of the second set.

Clause 34. The terminal of Clause 32 or 33, wherein the controller, receiver and transmitter being configured to operate together to cancel the transmission of the selected first repetition comprises the controller, receiver and transmitter being configured to operate together to determine whether the second timing advance value is greater than the first timing advance value; and
if it is determined that the second timing advance value is greater than the first timing advance value, select a repetition of the repetition series as the selected first repetition to be cancelled.

Clause 35. The terminal of any one of Clauses 32 to 34, the controller, receiver and transmitter being further configured to operate together to identify, based on the first number of transmissions, a gap time period wherein the selected first repetition is selected based on the gap time period.

Clause 36. The terminal of Clause 35, wherein the selected first repetition is selected based on a start time, an end time or a total duration of a transmission window for the selected first repetition falling within the gap time period.

Clause 37. The terminal of any one of Clauses 25 to 36, the controller, receiver and transmitter being further configured to operate together to:

stop the transmission of the repetition series to carry out a localisation procedure to obtain location information for the terminal;

determine the second timing advance value based on the location information; and resume transmission of the repetition series by transmitting the second set of repetitions.

Clause 38. The terminal of any one of Clauses 25 to 37, wherein the first set of repetitions comprises $N_1$ repetitions or $N_1-1$ repetitions of the plurality of repetitions.

Clause 39. The terminal of any one of Clauses 25 to 38, wherein the first number $N_1$ is based on one or more of a location of the NTN node, a travel direction of the NTN node, a speed of the NTN node, a location of the base station, a delay tolerance the base station, a location of the terminal, a travel direction of the terminal and a speed of the terminal.

Clause 40. The terminal of any one of Clauses 25 to 39 the controller, receiver and transmitter being further configured to operate together to determine a timing advance value change, wherein the controller, receiver and transmitter being configured to operate together to determine the second timing advance value comprises the controller, receiver and transmitter being configured to operate together to apply the timing advance value change to the first advance value.

Clause 41. The terminal of any one of Clauses 25 to 40, the controller, receiver and transmitter being further configured to operate together to:

identify a second number $N_2$ of repetitions, wherein the transmitting of the second set of repetitions is based on the second number $N_2$;

determine a third timing advance value;

modify the transmission timing of the uplink repetition series by updating the current timing advance value to the third timing advance value; and transmit a third set of repetitions of the uplink repetition series using the third timing advance value.

Clause 42. The terminal of Clause 41, wherein the second number $N_1$ of repetitions is less than, equal to or more than the first number $N_1$ of repetitions.

Clause 43. The terminal of any one of Clauses 25 to 42, wherein the base station and NTN node are partially or fully co-located.

Clause 44. Circuitry for a terminal for use in a non-terrestrial network "NTN" in a telecommunication system, the system comprising the terminal, an NTN node and a base station, wherein the circuitry comprises a controller element and a transceiver element configured to operate together to communicate with the base station via the NTN node, wherein the controller element and the transceiver element are further configured to operate together to:

identify an uplink transmission to be transmitted in the uplink as an uplink repetition series comprising a plurality of repetitions;

identify a first timing advance value for use as a current timing advance value for transmitting the uplink repetition series;

identify a first number $N_1$ of repetitions;

transmit, based on the first number $N_1$, a first set of repetitions of the uplink repetition series, using the first timing advance value;

determine a second timing advance value;

modify a transmission timing of the uplink repetition series, wherein the controller, receiver and transmitter being configured to operate together to modify the transmission timing comprises the controller, receiver and transmitter being configured to operate together to update the current timing advance value to the second timing advance value; and transmit a second set of repetitions of the uplink repetition series using the current timing advance value.

Clause 45. Circuitry for a terminal for use in a non-terrestrial network "NTN" in a telecommunication system, the system comprising the terminal, an NTN node and a base station, wherein the circuitry comprises a controller element and a transceiver element configured to operate together to communicate with the base station via the NTN node, wherein the controller element and the transceiver element are further configured to operate together to implement the method of any one of Clauses 1 to 19.

Clause 46. A base station for use in a non-terrestrial network "NTN" in a telecommunication system, the system comprising a terminal, an NTN node and the base station, wherein the base station comprises a controller, a receiver and a transmitter configured to operate together to communicate with the terminal via the NTN node, the controller, receiver and transmitter being configured to operate together to:

determine that the terminal intends to transmit a series of repetitions to the base station; determine compensation data comprising one or more of:

NTN node data comprising one or more of a speed of the NTN node and the path of the NTN node, base station data comprising a delay tolerance of the base station, and terminal data comprising location data for the terminal;

based on the compensation data, determine a first number $N_1$ of repetitions for the terminal to use a first timing advance value as its current timing advance value; and transmit the first number $N_1$ to the terminal.

Clause 47. The base station of Clause 46, the controller, receiver and transmitter being further configured to operate together to:

determine a gap duration for the terminal to delay or at least partially cancel a selected repetition of the series of repetitions;

transmit to the terminal an indication of the determined gap duration; and receive the repetition series based on the first number $N_1$ and the gap duration.

Clause 48. The base station of Clause 46 or 47 the controller, receiver and transmitter being further configured to operate together to:

based on determining that the terminal will perform a localisation procedure to obtain location information for the terminal, determine a gap duration for the terminal to carry out the localisation procedure and to delay or at least partially cancel a selected repetition of the series of repetitions based on the gap duration;

transmit to the terminal an indication of the determined gap duration; and receive the repetition series based on the first number $N_1$ and the gap duration.

Clause 49. The base station of any one of Clauses 46 to 48 the controller, receiver and transmitter being further configured to operate together to:
determine that, when the current timing advance value of the terminal increases, the terminal will perform an action selected from delaying the transmission of a repetition and cancelling the transmission of a repetition;
transmit to the terminal an indication of the selected action; and
receive the repetition series based on the first number $N_1$ and the selected action.

Clause 50. The base station of any one of Clauses 46 to 49 the controller, receiver and transmitter being further configured to operate together to:
detect, based on the first number $N_1$, that one repetition of the repetition series has not been received in the allocated timeframe;
upon detecting that the one repetition has not been received in the allocated timeframe, determine that the terminal has cancelled or delayed a transmission in response to an increased timing advance value.

Clause 51. Circuitry for a base station for use in a non-terrestrial network "NTN" in a telecommunication system, the system comprising a terminal, an NTN node and the base station, wherein the circuitry comprises a controller element and a transceiver element configured to operate together to communicate with the terminal via the NTN node, wherein the controller element and the transceiver element are further configured to operate together to:
determine that the terminal intends to transmit a series of repetitions to the base station; determine compensation data comprising one or more of:
NTN node data comprising one or more of a speed of the NTN node and the path of the NTN node, base station data comprising a delay tolerance of the base station, and
terminal data comprising location data for the terminal;
based on the compensation data, determine a first number $N_1$ of repetitions for the terminal to use a first timing advance value as its current timing advance value; and
transmit the first number $N_1$ to the terminal.

Clause 52. Circuitry for a base station for use in a non-terrestrial network "NTN" in a telecommunication system, the system comprising a terminal, an NTN node and the base station, wherein the circuitry comprises a controller element and a transceiver element configured to operate together to communicate with the terminal via the NTN node, wherein the controller element and the transceiver element are further configured to operate together to implement the method of any one of Clauses 20 to 24.

Clause 53. A system for use in a non-terrestrial network "NTN", the system comprising a terminal, an NTN node and the base station, wherein the terminal is configured to communicate with the base station via the NTN node, wherein the terminal is configured in accordance with one of Clauses 25 to 43 and the base station is configured in accordance with one of Clauses 46 to 50.

Clause 54 A computer program comprising instructions which, when the program is executed by a computer, cause the computer to carry out the method of any one Clauses 1 to 24.

REFERENCES

[1] TR 38.811, "Study on New Radio (NR) to support non terrestrial networks (Release 15)", 3rd Generation Partnership Project, September 2020.
[2] TR 38.821, "Solutions for NR to support Non-Terrestrial Networks (NTN) (Release 16)", 3rd Generation Partnership Project, December 2019.
[3] R1-2005496, "UL Time and Frequency Synchronisation for NR-NTN" MediaTek, Eutelsat, RAN1 #102e, August 2020
[4] RP-193235, "New Study WID on NB-IOT/eTMC support for NTN," MediaTek, RAN #86, December 2019
[5] EP Application No. 21151456.7, filed 13 Jan. 2021

The invention claimed is:

1. A method of operating a terminal in a non-terrestrial network "NTN" in a telecommunication system, the system comprising the terminal, an NTN node and a base station, wherein the terminal is configured to communicate with the base station via the NTN node, the method comprising:
identifying an uplink transmission to be transmitted in the uplink as an uplink repetition series comprising a plurality of repetitions;
identifying a first timing advance value for use as a current timing advance value for transmitting the uplink repetition series;
identifying a first number $N_1$ of repetitions;
transmitting, based on the first number $N_1$, a first set of repetitions of the uplink repetition series, using the first timing advance value;
determining a second timing advance value;
modifying a transmission timing of the uplink repetition series, wherein modifying the transmission timing comprises updating the current timing advance value to the second timing advance value; and
transmitting a second set of repetitions of the uplink repetition series using the current timing advance value.

2. The method of claim 1, wherein modifying the transmission timing of the uplink repetition series comprises delaying the start of the transmission of the second set of repetitions relative to the start of the transmission of the second set of repetitions when using the first timing advance value.

3. The method of claim 1, wherein modifying the transmission timing of the uplink repetition series comprises introducing a time gap between the first set of repetitions and the second set of repetitions.

4. The method of claim 3, wherein the time gap is introduced by delaying the start of the transmission of the second set of repetitions relative to the start of the transmission of the second set of repetitions when using the first timing advance value.

5. The method of claim 3, wherein the time gap is introduced by cancelling at least part of a selected repetition of the first set of repetitions or at least part of a selected repetition of the second set of repetitions.

6. The method of claim 1, further comprising cancelling the transmission of a selected first repetition of the uplink repetition series.

7. The method of claim 6, wherein the selected first repetition is the last repetition of the first set of repetitions or the first repetition of the second set.

8. The method of claim 6, wherein cancelling the transmission of the selected first repetition comprises:

determining whether the second timing advance value is greater than the first timing advance value; and
if it is determined that the second timing advance value is greater than the first timing advance value, selecting a repetition of the repetition series as the selected first repetition to be cancelled.

9. The method of claim 6, further comprising based on the first number of transmissions, identifying a gap time period wherein the selected first repetition is selected based on the gap time period.

10. The method of claim 9, wherein the selected first repetition is selected based on a start time, an end time or a total duration of a transmission window for the selected first repetition falling within the gap time period.

11. The method of claim 1, further comprising:
stopping transmission of the repetition series to carry out a localisation procedure to obtain location information for the terminal;
determining the second timing advance value based on the location information; and
resuming transmission of the repetition series by transmitting the second set of repetitions.

12. The method of claim 1, further comprising:
identifying a second number $N_2$ of repetitions, wherein the transmitting of the second set of repetitions is based on the second number $N_2$;
determining a third timing advance value;
modifying the transmission timing of the uplink repetition series by updating the current timing advance value to the third timing advance value; and
transmitting a third set of repetitions of the uplink repetition series using the third timing advance value.

13. Circuitry for a terminal for use in a non-terrestrial network "NTN" in a telecommunication system, the system comprising the terminal, an NTN node and a base station, wherein the circuitry comprises a controller element and a transceiver element configured to operate together to communicate with the base station via the NTN node, wherein the controller element and the transceiver element are further configured to operate together to:
identify an uplink transmission to be transmitted in the uplink as an uplink repetition series comprising a plurality of repetitions;
identify a first timing advance value for use as a current timing advance value for transmitting the uplink repetition series;
identify a first number $N_1$ of repetitions;
transmit, based on the first number $N_1$, a first set of repetitions of the uplink repetition series, using the first timing advance value;
determine a second timing advance value;
modify a transmission timing of the uplink repetition series, wherein the controller, receiver and transmitter being configured to operate together to modify the transmission timing comprises the controller, receiver and transmitter being configured to operate together to update the current timing advance value to the second timing advance value; and
transmit a second set of repetitions of the uplink repetition series using the current timing advance value.

14. A base station for use in a non-terrestrial network "NTN" in a telecommunication system, the system comprising a terminal, an NTN node and the base station, wherein the base station comprises a controller, a receiver and a transmitter configured to operate together to communicate with the terminal via the NTN node, the controller, receiver and transmitter being configured to operate together to:
determine that the terminal intends to transmit a series of repetitions to the base station;
determine compensation data comprising one or more of:
NTN node data comprising one or more of a speed of the NTN node and the path of the NTN node,
base station data comprising a delay tolerance of the base station, and
terminal data comprising location data for the terminal;
based on the compensation data, determine a first number $N_1$ of repetitions for the terminal to use a first timing advance value as its current timing advance value; and
transmit the first number $N_1$ to the terminal.

15. The base station of claim 14, the controller, receiver and transmitter being further configured to operate together to:
determine a gap duration for the terminal to delay or at least partially cancel a selected repetition of the series of repetitions;
transmit to the terminal an indication of the determined gap duration; and
receive the repetition series based on the first number $N_1$ and the gap duration.

16. The base station of claim 14, the controller, receiver and transmitter being further configured to operate together to:
based on determining that the terminal will perform a localisation procedure to obtain location information for the terminal, determine a gap duration for the terminal to carry out the localisation procedure and to delay or at least partially cancel a selected repetition of the series of repetitions based on the gap duration;
transmit to the terminal an indication of the determined gap duration; and
receive the repetition series based on the first number $N_1$ and the gap duration.

17. The base station of claim 14, the controller, receiver and transmitter being further configured to operate together to:
determine that, when the current timing advance value of the terminal increases, the terminal will perform an action selected from delaying the transmission of a repetition and cancelling the transmission of a repetition;
transmit to the terminal an indication of the selected action; and
receive the repetition series based on the first number $N_1$ and the selected action.

18. The base station of claim 14, the controller, receiver and transmitter being further configured to operate together to:
detect, based on the first number $N_1$, that one repetition of the repetition series has not been received in the allocated timeframe;
upon detecting that the one repetition has not been received in the allocated timeframe, determine that the terminal has cancelled or delayed a transmission in response to an increased timing advance value.

* * * * *